（12) United States Patent
Divekar et al.

(10) Patent No.: US 12,311,780 B2
(45) Date of Patent: May 27, 2025

(54) LOW VOLTAGE POWER DISTRIBUTION UNIT FOR AUTONOMOUS VEHICLE

(71) Applicant: Nuro, Inc., Mountain View, CA (US)

(72) Inventors: Noopur Divekar, Santa Clara, CA (US); Tao Yang, Martinez, CA (US); Heba Mustufa, Mountain View, CA (US); Bryan McLaughlin, Cambridge, MA (US); Paul White, Mountain View, CA (US); Quresh Sutarwala, Fremont, CA (US); Prasanna Nambi, San Jose, CA (US)

(73) Assignee: NURO, INC., Mountain View, CA (US)

( * ) Notice: Subject to any disclaimer, the term of this patent is extended or adjusted under 35 U.S.C. 154(b) by 796 days.

(21) Appl. No.: 17/547,693

(22) Filed: Dec. 10, 2021

(65) Prior Publication Data

US 2022/0185115 A1 Jun. 16, 2022

Related U.S. Application Data

(60) Provisional application No. 63/124,427, filed on Dec. 11, 2020.

(51) Int. Cl.
*B60L 3/00* (2019.01)
*B60L 58/20* (2019.01)
(Continued)

(52) U.S. Cl.
CPC ............. *B60L 3/0046* (2013.01); *B60L 58/20* (2019.02); *B60W 10/26* (2013.01);
(Continued)

(58) Field of Classification Search
CPC .... B60L 3/0046; B60L 58/20; B60L 2210/10; B60W 60/0023; B60W 10/26;
(Continued)

(56) References Cited

U.S. PATENT DOCUMENTS 10,800,264 B2 * 10/2020 Liu ..................... G05D 1/0088
2016/0096438 A1 * 4/2016 Grimes .................. B60L 53/18
320/109

(Continued)

FOREIGN PATENT DOCUMENTS

DE 102017117194 A1 2/2018
EP 3616974 A1 3/2020
JP 2020104736 A 7/2020

OTHER PUBLICATIONS

International Search Report mailed Sep. 19, 2022 for PCT Application PCT/US2021/063046.

*Primary Examiner* — Rafael O Leon De Domenech
(74) *Attorney, Agent, or Firm* — Edell, Shapiro & Finnan, LLC

(57) ABSTRACT

According to one aspect, an autonomous vehicle includes hardware systems which receive relatively low voltage from a low voltage power distribution unit (LVPDU). An LVPDU includes a power source such as a DC-DC converter and a plurality of backup batteries. The plurality of backup batteries is configured to provide backup power to subsets of components arranged to effectively all be powered by the power source onboard the LVPDU. The backup batteries may be tested, substantially while LVPDU is being used to provide power. The backup batteries may be charged substantially in parallel.

20 Claims, 17 Drawing Sheets

(51) Int. Cl.
  *B60W 10/26* (2006.01)
  *B60W 30/18* (2012.01)
  *B60W 60/00* (2020.01)
(52) U.S. Cl.
  CPC ...... *B60W 30/181* (2013.01); *B60W 60/0023* (2020.02); *B60L 2210/10* (2013.01); *B60W 2420/403* (2013.01); *B60W 2420/408* (2024.01); *B60W 2510/242* (2013.01); *B60W 2710/242* (2013.01)
(58) Field of Classification Search
  CPC ......... B60W 30/181; B60W 2420/408; B60W 2420/403; B60W 2510/242; B60W 2710/242
  See application file for complete search history.

(56) References Cited

U.S. PATENT DOCUMENTS

| | | | |
|---|---|---|---|
| 2016/0229298 A1* | 8/2016 | Chen | B60L 58/20 |
| 2018/0208064 A1* | 7/2018 | Wortberg | B60L 3/0092 |
| 2019/0039457 A1* | 2/2019 | Katrak | H02M 3/157 |
| 2019/0084425 A1 | 3/2019 | Liu et al. | |
| 2020/0180653 A1 | 6/2020 | Chi et al. | |

* cited by examiner

LOW VOLTAGE POWER DISTRIBUTION UNIT FOR AUTONOMOUS VEHICLE

PRIORITY CLAIM

This patent application claims the benefit of priority under 35 U.S.C. § 119 to U.S. Provisional Patent Application No. 63/124,427, filed Dec. 11, 2020, titled "LOW VOLTAGE POWER DISTRIBUTION UNIT FOR AUTONOMOUS VEHICLE"; the aforementioned priority application being hereby incorporated by reference in its entirety.

TECHNICAL FIELD

The disclosure relates to autonomous vehicles. More particularly, the disclosure relates to providing a power distribution systems for use in efficiently providing low voltage power to components of an autonomous vehicle.

BACKGROUND

The use of autonomous vehicles is growing. Autonomous vehicles may operate under the control of an autonomy system, or under the control of a remote operator, as for example via a teleoperations system. To enable autonomous vehicles to operate safely, systems of the autonomous vehicle that support control by an autonomy system and/or support control by a remote operator must generally be robust and provide redundancy. Providing robustness and redundancy generally includes provide backup systems such as backup power systems.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
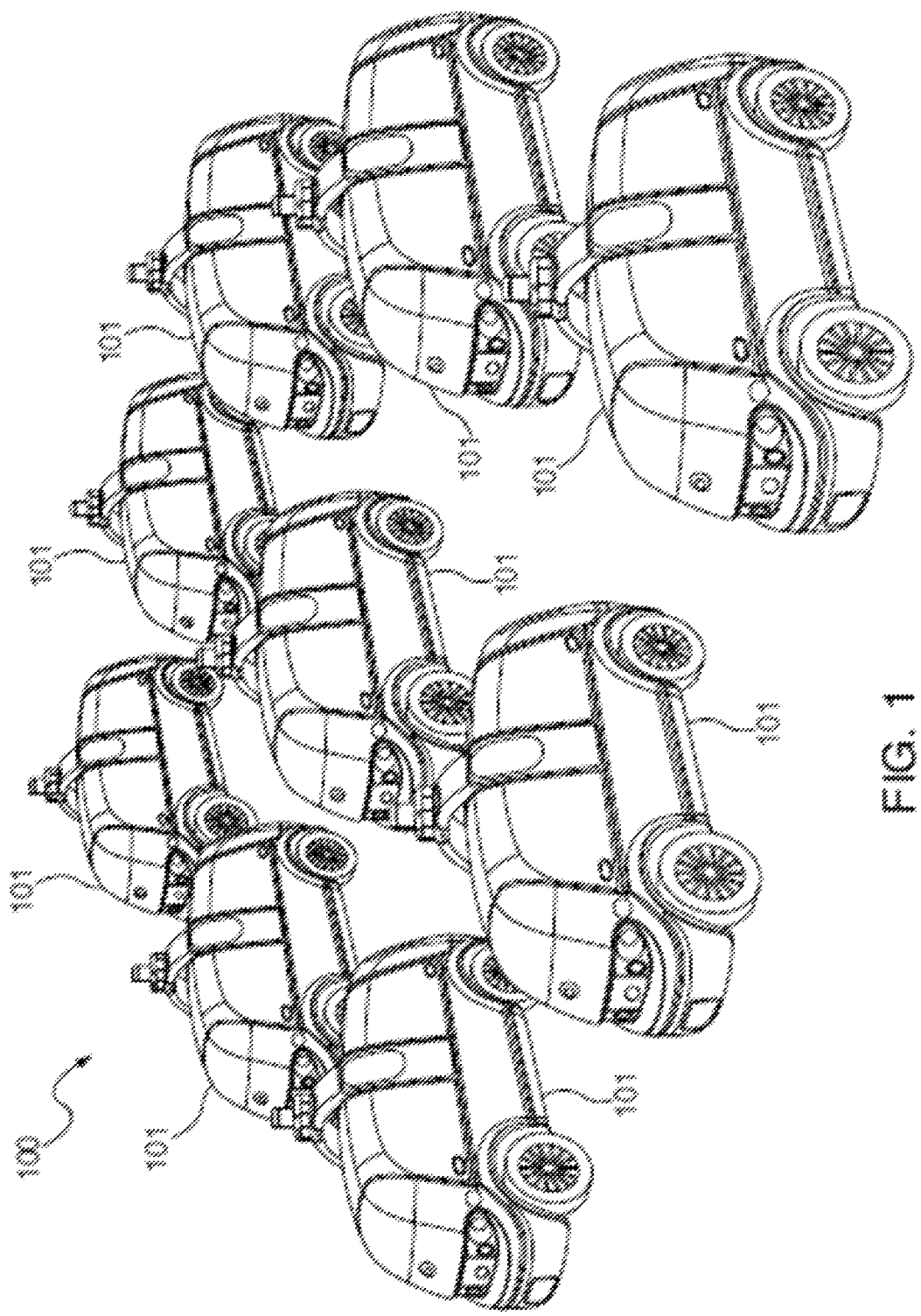
FIG. 1 is a diagrammatic representation of an autonomous vehicle fleet in accordance with an embodiment.

In one embodiment, an autonomous vehicle includes hardware systems which receive relatively low voltage from a low voltage power distribution unit (LVPDU). An LVPDU includes a power source such as a DC-DC converter and a plurality of backup batteries. The plurality of backup batteries is configured to provide backup power to subsets of components arranged to effectively all be powered by the power source onboard the LVPDU. The backup batteries may be tested, substantially while LVPDU is being used to provide power. The backup batteries may be charged substantially in parallel.

In another embodiment, a power system for a vehicle may comprise a primary battery, one or more DC-DC converters, a first power distribution unit, and a second power distribution unit. The primary battery may output power at a first voltage and the one or more DC-DC converters may receive power output by the primary battery and output power at a second voltage that is lower than the first voltage. The first power distribution unit may be configured to (i) receive power, at the second voltage, from the one or more DC-DC converters or from a first backup battery and (ii) provide the received power to a first low voltage power domain of the vehicle. The first power distribution unit may comprise a first input switch for connecting to the one or more DC-DC converters. The second power distribution unit may be configured to (i) receive power, at the second voltage, from the one or more DC-DC converters or from a second backup battery and (ii) provide the received power to a second low voltage power domain of the vehicle. The second power distribution unit may comprise a second input switch for connecting to the one or more DC-DC converters. In response to detecting a fault condition, the first input switch of the first power distribution unit may be opened to disconnect the first power distribution unit from the one or more DC-DC converters, and the first power distribution unit may receive power from the first low backup battery.

In another embodiment, a vehicle may be capable of operating autonomously or semi-autonomously. The vehicle may comprise a main computing system configured to generate primary autonomy commands based on data output by a first set of sensors and by a second set of sensors, a redundant computing system configured to generate backup autonomy commands, a vehicle control system configured to control the vehicle based on the primary autonomy commands or the backup autonomy commands, a first power distribution unit configured to receive power from a primary power source of the vehicle or from a first backup power source and configured to provide the received power to the first set of sensors, the vehicle control system, and the redundant computing system, and a second power distribution unit configured to receive power from the primary power source of the vehicle or from a second backup power source and configured to provide the received power to the second set of sensors, the vehicle control system, and the redundant computing system.

In another embodiment, a method for supplying power to components of a vehicle may include converting, by one or more DC-DC converters, power supplied by a primary battery of the vehicle from a first voltage to a second voltage. The one or more DC-DC converters may be configured to supply power having the second voltage to a first power domain and to a second power domain. The method may also comprise monitoring for a fault condition and, in response to detecting the fault condition, disconnecting at least one of the first power domain and the second power domain from the one or more DC-DC converters. The method may further comprise operating the vehicle in an autonomous manner under the fault condition Description Autonomous vehicles, which may include fully autonomous or semi-autonomous vehicles, generally include hardware systems which support the ability for vehicles to operate substantially in a driverless manner, without drivers onboard the vehicles. Such hardware may be arranged substantially within a vehicle, and may include hardware and/or software that facilitates the operation of systems within the vehicle.

As used herein, "low voltage" may refer to a wide range of voltages. In certain implementations, low voltage may be any voltage that is less than 50 volts (e.g., 12V, 48V, etc.). The terms "low voltage" and "high voltage" may also simply refer to voltage ranges relative to each other (e.g., low voltage may refer to any voltage in the 0V to 60V voltage range while high voltage may refer to any voltage above 60V). Furthermore, a power domain may refer to a collection of components that are powered by the same power supply. In the context of a low voltage power domain, the collection of components within the low voltage power domain may each receive power from the same low voltage power distribution unit (LVPDU).

The hardware may include at least one system which is powered, at least in part, using a low voltage power supply. In one embodiment, a low voltage power supply may be configured as a low voltage power distribution unit (LVPDU). Such an LVPDU may include at least one power source, as for example a DC-DC converter, and a plurality of backup batteries which may provide low power to a system of an autonomous vehicle in the event that the power source is not functioning or not fully functioning.

An autonomous vehicle that includes hardware which supports autonomy and other functions, as well as an LVPDU, may generally be part of a fleet of vehicles. Referring initially to FIG. 1, an autonomous vehicle fleet will be described in accordance with an embodiment. An autonomous vehicle fleet 100 includes a plurality of autonomous vehicles 101, or robot vehicles. Autonomous vehicles 101 are generally arranged to transport and/or to deliver cargo, items, and/or goods. Autonomous vehicles 101 may be fully autonomous and/or semi-autonomous vehicles. In general, each autonomous vehicle 101 may be a vehicle that is capable of travelling in a controlled manner for a period of time without intervention, e.g., without human intervention. As will be discussed in more detail below, each autonomous vehicle 101 may include a power system, a propulsion or conveyance system, a navigation module, a control system or controller, a communications system, a processor, and a sensor system.

Dispatching of autonomous vehicles 101 in autonomous vehicle fleet 100 may be coordinated by a fleet management module (not shown). The fleet management module may dispatch autonomous vehicles 101 for purposes of transporting, delivering, and/or retrieving goods or services in an unstructured open environment or a closed environment.

Figure 2:
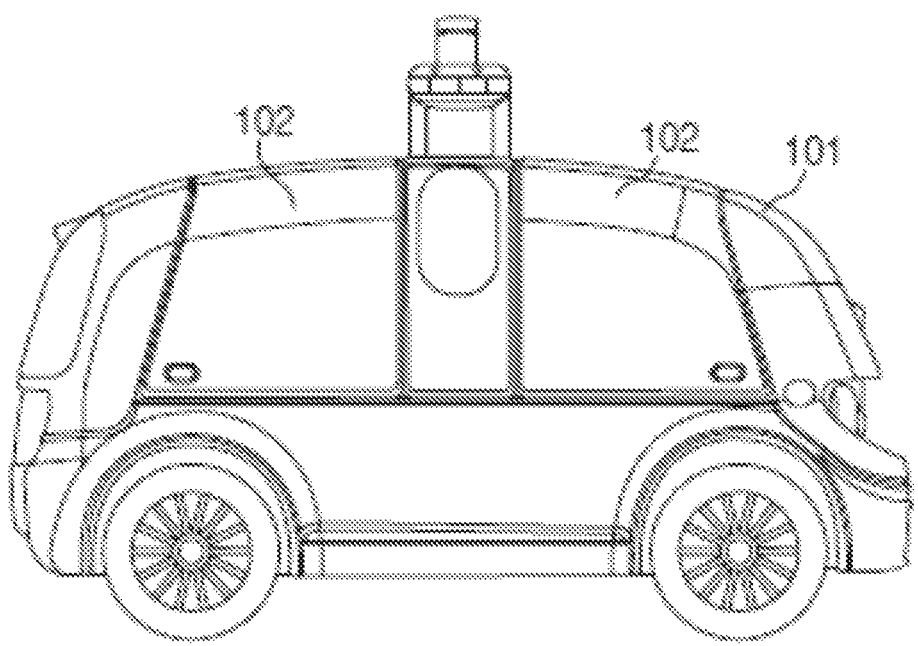
FIG. 2 is a diagrammatic representation of a side of an autonomous vehicle in accordance with an embodiment.

FIG. 2 is a diagrammatic representation of a side of an autonomous vehicle, e.g., one of autonomous vehicles 101 of FIG. 1, in accordance with an embodiment. Autonomous vehicle 101, as shown, is a vehicle configured for land travel. Typically, autonomous vehicle 101 includes physical vehicle components such as a body or a chassis, as well as conveyance mechanisms, e.g., wheels. In one embodiment, autonomous vehicle 101 may be relatively narrow, e.g., approximately two to approximately five feet wide, and may have a relatively low mass and relatively low center of gravity for stability. Autonomous vehicle 101 may be arranged to have a working speed or velocity range of between approximately one and approximately forty-five miles per hour (mph), e.g., approximately twenty-five miles per hour. In some embodiments, autonomous vehicle 101 may have a substantially maximum speed or velocity in range between approximately thirty and approximately ninety mph.

Autonomous vehicle 101 includes a plurality of compartments 102. Compartments 102 may be assigned to one or more entities, such as one or more customer, retailers, and/or vendors. Compartments 102 are generally arranged to contain cargo, items, and/or goods. Typically, compartments 102 may be secure compartments. It should be appreciated that the number of compartments 102 may vary. That is, although two compartments 102 are shown, autonomous vehicle 101 is not limited to including two compartments 102.

Figure 3:
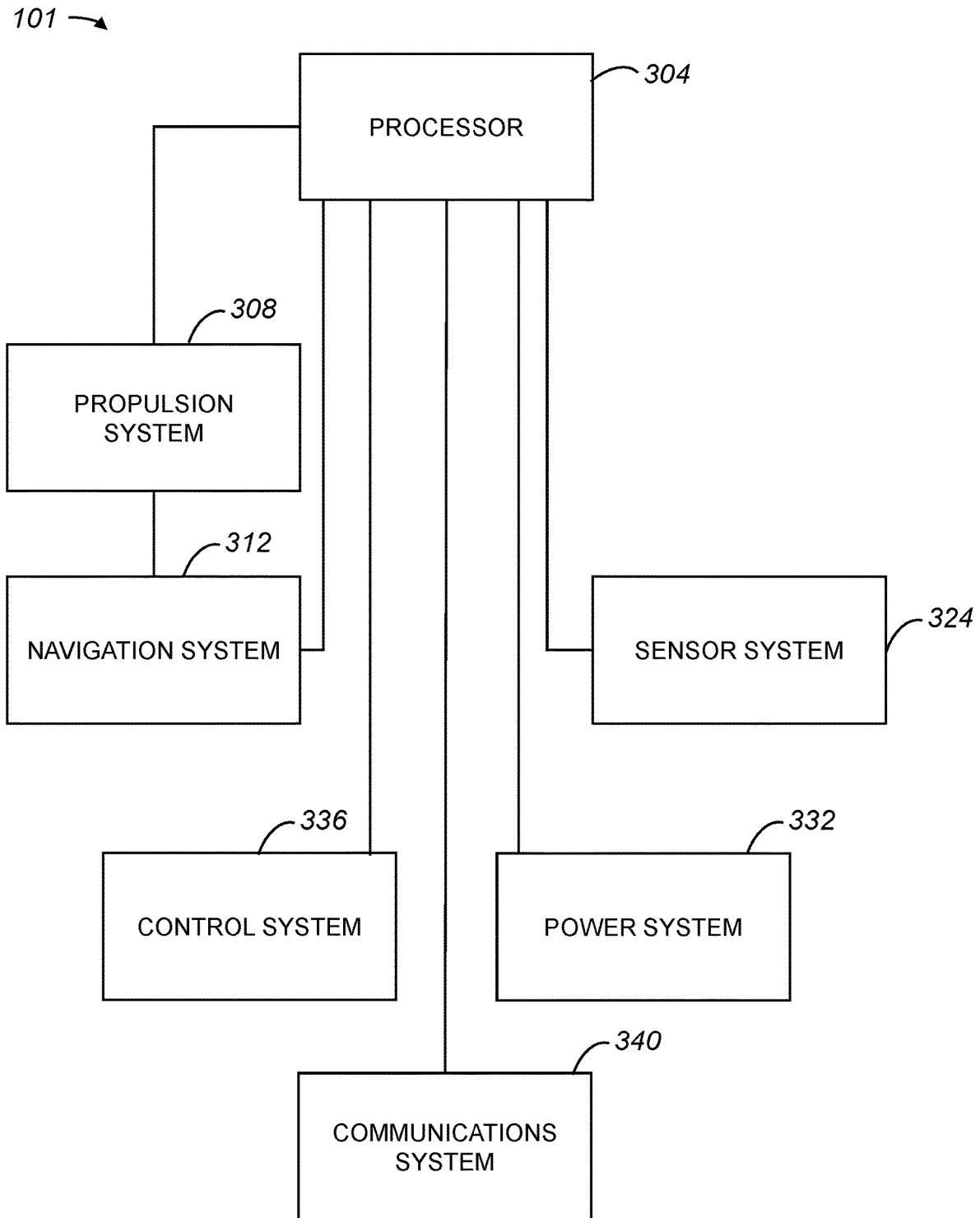
FIG. 3 is a block diagram representation of an autonomous vehicle in accordance with an embodiment.

FIG. 3 is a block diagram representation of an autonomous vehicle, e.g., autonomous vehicle 101 of FIG. 1, in accordance with an embodiment. An autonomous vehicle 101 includes a processor 304, a propulsion system 308, a navigation system 312, a sensor system 324, a power system 332, a control system 336, and a communications system 340. It should be appreciated that processor 304, propulsion system 308, navigation system 312, sensor system 324, power system 332, and communications system 340 are all coupled to a chassis or body of autonomous vehicle 101.

Processor 304 is arranged to send instructions to and to receive instructions from or for various components such as propulsion system 308, navigation system 312, sensor system 324, power system 332, and control system 336. Propulsion system 308, or a conveyance system, is arranged to cause autonomous vehicle 101 to move, e.g., drive. For example, when autonomous vehicle 101 is configured with a multi-wheeled automotive configuration as well as steering, braking systems and an engine, propulsion system 308 may be arranged to cause the engine, wheels, steering, and braking systems to cooperate to drive. In general, propulsion system 308 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine.

Navigation system 312 may control propulsion system 308 to navigate autonomous vehicle 101 through paths and/or within unstructured open or closed environments. Navigation system 312 may include at least one of digital maps, street view photographs, and a global positioning system (GPS) point. Maps, for example, may be utilized in cooperation with sensors included in sensor system 324 to allow navigation system 312 to cause autonomous vehicle 101 to navigate through an environment.

Sensor system 324 includes any sensors, as for example LiDAR, radar, ultrasonic sensors, microphones, altimeters, and/or cameras. Sensor system 324 generally includes onboard sensors which allow autonomous vehicle 101 to safely navigate, and to ascertain when there are objects near autonomous vehicle 101. In one embodiment, sensor system 324 may include propulsion systems sensors that monitor drive mechanism performance, drive train performance, and/or power system levels.

Power system 332 is arranged to provide power to autonomous vehicle 101. Power may be provided as electrical power, gas power, or any other suitable power, e.g., solar power or battery power. In one embodiment, power system 332 may include a main power source, and an auxiliary power source that may serve to power various components of autonomous vehicle 101 and/or to generally provide power to autonomous vehicle 101 when the main power source does not have the capacity to provide sufficient power. It should be appreciated that power system 332 may generally include an LVPDU and/or sources which may provide power to the LVPDU, e.g., to a power source onboard the LVPDU.

Communications system 340 allows autonomous vehicle 101 to communicate, as for example, wirelessly, with a fleet management system (not shown) that allows autonomous vehicle 101 to be controlled remotely. Communications system 340 generally obtains or receives data, stores the data, and transmits or provides the data to a fleet management system and/or to autonomous vehicles 101 within a fleet 100. The data may include, but is not limited to including, information relating to scheduled requests or orders, information relating to on-demand requests or orders, and/or information relating to a need for autonomous vehicle 101 to reposition itself, e.g., in response to an anticipated demand.

In some embodiments, control system 336 may cooperate with processor 304 to determine where autonomous vehicle 101 may safely travel, and to determine the presence of objects in a vicinity around autonomous vehicle 101 based on data, e.g., results, from sensor system 324. In other words, control system 336 may cooperate with processor 304 to effectively determine what autonomous vehicle 101 may do within its immediate surroundings. Control system 336 in cooperation with processor 304 may essentially control power system 332 and navigation system 312 as part of driving or conveying autonomous vehicle 101. Additionally, control system 336 may cooperate with processor 304 and communications system 340 to provide data to or obtain data from other autonomous vehicles 101, a management server, a global positioning server (GPS), a personal computer, a teleoperations system, a smartphone, or any computing device via the communication module 340. In general, control system 336 may cooperate at least with processor 304, propulsion system 308, navigation system 312, sensor system 324, and power system 332 to allow vehicle 101 to operate autonomously. That is, autonomous vehicle 101 is able to operate autonomously through the use of an autonomy system that effectively includes, at least in part, functionality provided by propulsion system 308, navigation system 312, sensor system 324, power system 332, and control system 336.

As will be appreciated by those skilled in the art, when autonomous vehicle 101 operates autonomously, vehicle 101 may generally operate, e.g., drive, under the control of an autonomy system. That is, when autonomous vehicle 101 is in an autonomous mode, autonomous vehicle 101 is able to generally operate without a driver or a remote operator controlling autonomous vehicle. In one embodiment, autonomous vehicle 101 may operate in a semi-autonomous mode or a fully autonomous mode. When autonomous vehicle 101 operates in a semi-autonomous mode, autonomous vehicle 101 may operate autonomously at times and may operate under the control of a driver or a remote operator at other times. When autonomous vehicle 101 operates in a fully autonomous mode, autonomous vehicle 101 typically operates substantially only under the control of an autonomy system. The ability of an autonomous system to collect information and extract relevant knowledge from the environment provides autonomous vehicle 101 with perception capabilities. For example, data or information obtained from sensor system 324 may be processed such that the environment around autonomous vehicle 101 may effectively be perceived.

In general, processor 304, propulsion system 308, navigation system 312, sensor system 324, power system 332, control system 336, and communications system 340 may include hardware and software components. That is, the functionality of systems of autonomous vehicle 101 may be embodied as hardware and software components. With respect to FIG. 4, hardware included in an autonomous vehicle such as autonomous vehicle 101 will be described in accordance with an embodiment. It should be appreciated that such hardware may include components configured to effectively execute software or program code devices.

Autonomous vehicle 101' may include, but is not limited to including, a main compute 442, a brain stem computer (BSC) 446, and a redundant autonomy compute or a cameragator 450. Main compute 442 generally includes hardware which supports the operation of an autonomy system which allows vehicle 101' to operate in an autonomous matter. BSC 446 generally includes hardware which serves to act as the command center of vehicle 101'. Redundant autonomy computer 450 generally includes hardware that may provide backup or additional support for systems of vehicle 101', e.g., main compute 442. Main compute 442 will be discussed in more detail below with respect to FIG. 5.

Figure 4:
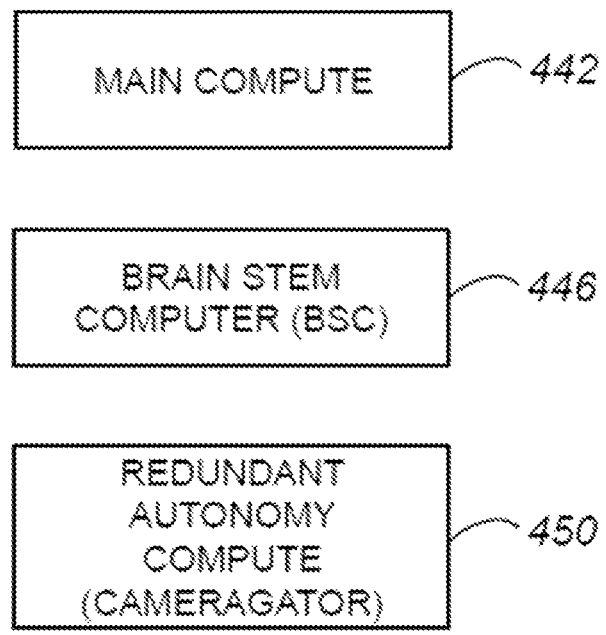
FIG. 4 is a block diagram representation of an autonomous vehicle, e.g., autonomous vehicle 101 of FIGS. 2 and 3, with a main compute in accordance with an embodiment.
Figure 5:
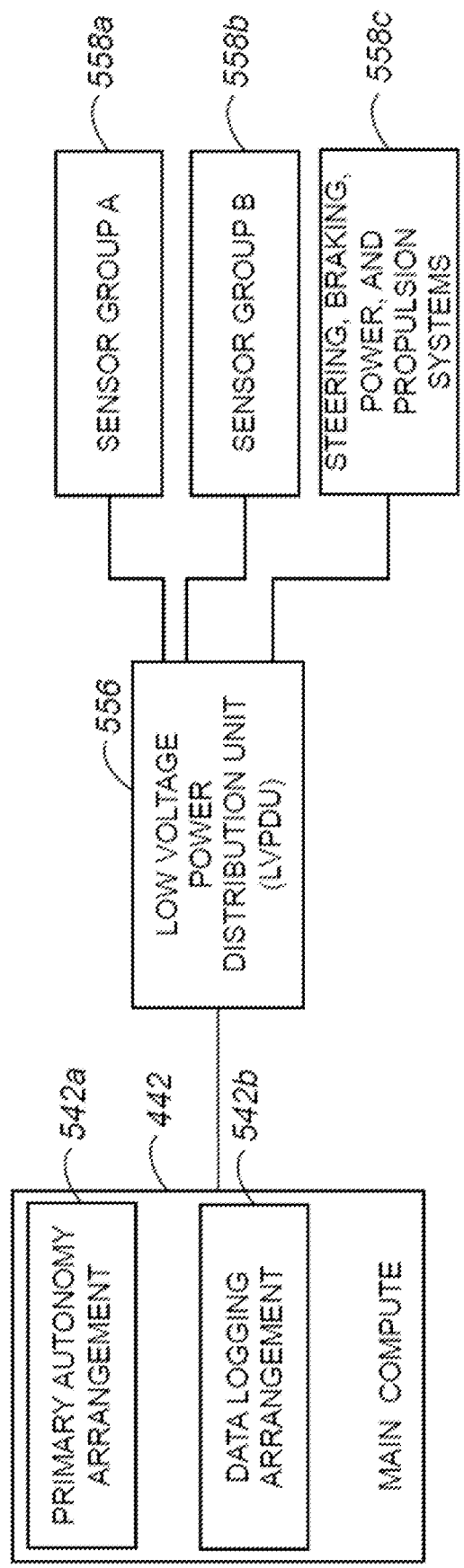
FIG. 5 is a block diagram representation of a low voltage power distribution unit (LVPDU) in communication with a main compute, e.g., main compute 442 of FIG. 4, and other systems in accordance with an embodiment.

FIG. 5 is a block diagram representation of an LVPDU in communication with a main compute, e.g., main compute 442 of FIG. 4, and other systems in accordance with an embodiment. An LVPDU 556 may be coupled to a main compute 442 and to various components or systems 558a-c onboard a vehicle such as vehicle 101' of FIG. 4.

Main compute 442 may generally include a primary autonomy arrangement 542a and a data logging arrangement 542b. Primary autonomy arrangement 542a generally includes components, e.g., hardware components and/or software components, which allow a vehicle such as vehicle 101' of FIG. 4 to operate autonomously. Primary autonomy arrangement 542a may be configured to support autonomous driving at substantially any level defined by the Society of Automotive Engineers (SAE), as for example at Level 3 with conditional driving automation, Level 4 with high driving automation, and/or Level 5 with full driving automation. Data logging arrangement 542*b* may include memory which stores data collected as vehicle 101' of FIG. 4 operates. Such data may include, but is not limited to including, perception data and autonomy data. Data logging arrangement 542*b* may be configured as a removable storage drive or as a memory from which data may be downloaded, as for example over a wireless connection or over a wired connection such as an Ethernet connection. It should be appreciated that data logging arrangement 542*b* may include an input/output port which enables data to be offloaded.

LVPDU 556 is generally configured to provide low voltage power to components within main compute 442 and systems 558*a-c*. Systems 558*a-c* generally include, but are not limited to including, sensor groups 558*a*, 558*b* and steering, braking, power, and propulsion systems 558*c*. Sensor groups 558*a*, 558*b* may be arranged such that in the even that one sensor group 558*a*, 558*b* is not functioning as expected, the other sensor group 558*a*, 558*b* may effectively enable a vehicle such as vehicle 101' of FIG. 4 to continue to operate. In one embodiment, sensor groups 558*a*, 558*b* may be autonomy subsystems associated with primary autonomy arrangement 542*a*.

Sensor group A 558*a* may include, but is not limited to including, a long range lidar unit, a short range radar unit, a long range camera, a short range camera, a thermal camera, a universal serial interface (USS), and/or a microphone. Sensor group B 558*b* may include, but is not limited to including, a short range lidar unit, a long range radar unit, a long range camera, a short range camera, and/or a traffic light camera.

In one embodiment, LVPDU 556 is configured such that a main or primary power source onboard LVPDU 556 is configured to provide power to substantially all systems 558*a-c*, while backup power sources, e.g., a plurality of backup batteries, onboard LVPDU 556 are configured to provide power to different systems 558*a-c*. For example, a first backup battery of LVPDU 556 may provide backup power to sensor group A 558*a*, and a second backup battery of LVPDU 556 may provide backup power to sensor group B 558*b*. Further, a main power source of LVPDU 556 may be arranged to provide power to primary autonomy arrangement 542*a* and data logging arrangement 542*b*, while backup power sources may be arranged to each provide power to different components within main compute 442.

Figure 6:
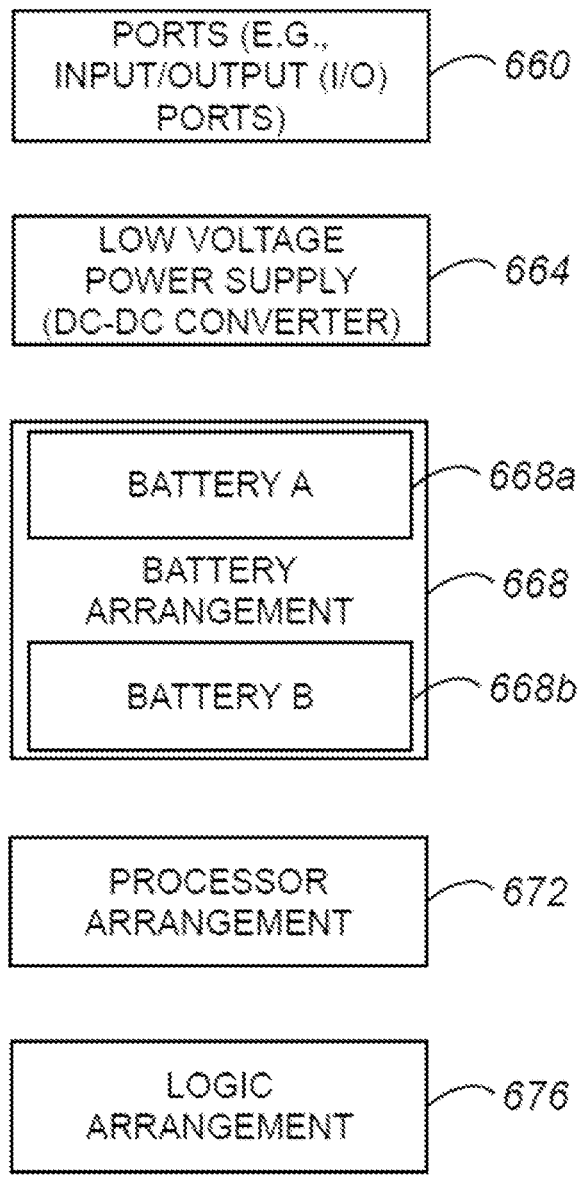
FIG. 6 is a block diagram representation of an LVPDU, e.g., LVPDU 556 of FIG. 5, in accordance with an embodiment.

Referring next to FIG. 6, LVPDU 556 will be described in more detail in accordance with an embodiment. LVPDU 556 includes ports such as input/output (I/O) ports 660, a low voltage power supply 664, a battery arrangement 668, a processor arrangement 672, and a logic arrangement 676. Ports 660 may be configured to enable LVPDU 556 to be coupled to components and/or systems that are arranged to be powered by LVPDU 556.

Low voltage power supply or source 664 is configured to be a source of voltage onboard LVPDU 556. In one embodiment, low voltage power supply 664 may be a DC-DC converter. It should be appreciated, however, that low voltage power supply 664 us not limited to being a DC-DC converter.

Battery arrangement 668 generally includes a plurality of batteries 668*a*, 668*b*. While two batteries 668*a*, 668*b* are shown, it should be understood that the number of batteries 668*a*, 668*b* included in battery arrangement 668 may vary widely. Each battery 668*a*, 668*b* may be arranged to provide backup power to a particular set of components, to a particular system, and/or to particular peripherals. For example, with reference to FIG. 5, if low voltage power supply 664 provides power to sensor group A 558*a* and sensor group B 558*b*, battery A 668*a* may be arranged to provide backup power to sensor group A 558*a* while battery B 668*b* may be arranged to provide backup power to sensor group B 558*b*. It should be appreciated that batteries 668*a*, 668*b* may also be configured to power different components or systems within a main compute, or one battery 668*a*, 668*b* may instead be arranged to provide backup power to main compute.

Figure 7:
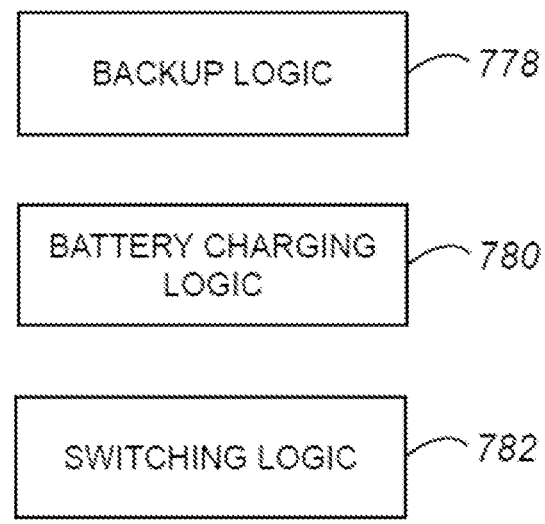
FIG. 7 is a block diagram representation of a logic arrangement of an LVPDU, e.g., logic arrangement 676 of LVPDU 556 of FIG. 6, in accordance with an embodiment.

Processor arrangement 672, which may include one or more processors, is configured to cooperate with logic arrangement 676 to execute logic associated with logic arrangement 676. With reference to FIG. 7, logic arrangement 676 will be discussed in accordance with an embodiment. Logic arrangement 676 includes hardware and/or software devices which facilitate the use of LVPDU 556 of FIG. 6. In one embodiment, logic arrangement 676 includes backup logic 778, battery charging logic 780, and switching logic 782.

Backup logic 778 is configured to determine how backup power may be provided using battery arrangement 668 of FIG. 6, in the event that sufficient power may not be provided using low voltage power supply 664 of FIG. 6. One method of utilizing backup logic 778 will be discussed below with reference to FIG. 8.

Battery charging logic 780 is configured to enable battery arrangement 668 of FIG. 6 or, more specifically, batteries 668*a*, 668*b* to be charged. In one embodiment, battery charging logic 780 is arranged to cause batteries 668*a*, 668*b* of FIG. 6 to be charged substantially in parallel, as will be discussed below with reference to FIG. 9.

Switching logic 782 is configured to allow battery arrangement 668 of FIG. 6 to effectively be tested, as for example while LVPDU 556 is in use. In one embodiment, switching logic 782 periodically switches to utilizing battery arrangement 668 of FIG. 6 to provide power even when low voltage power supply 664 is functioning as expected or desired. Such switching enables an assessment to be made as to whether battery arrangement 668 of FIG. 6 is capable of essentially taking over from low voltage power supply 664. One method of testing backup batteries will be discussed below with respect to FIG. 10.

Figure 8:
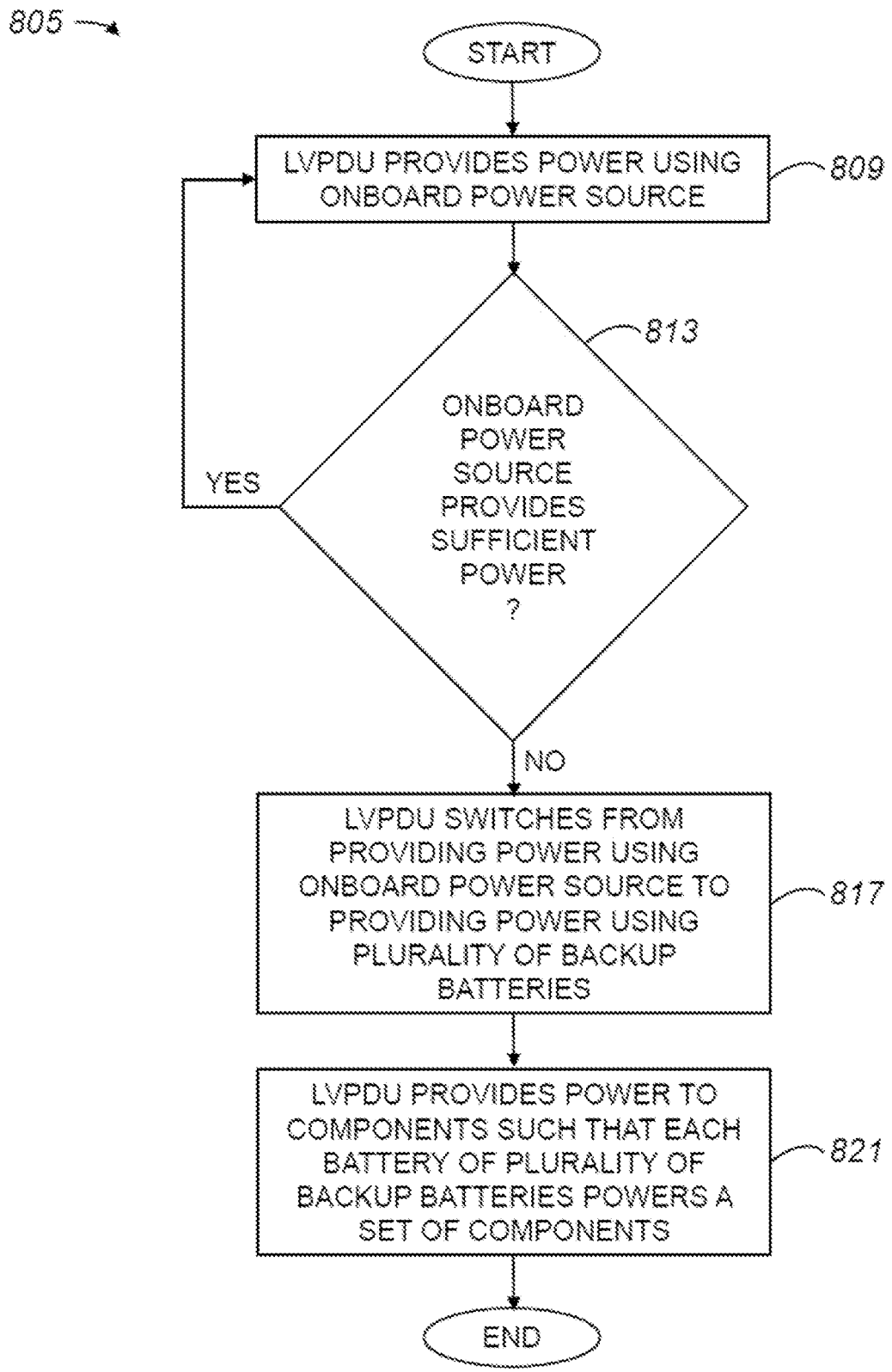
FIG. 8 is a process flow diagram which illustrates a method of providing power using backup batteries of an LVPDU in accordance with an embodiment.

FIG. 8 is a process flow diagram which illustrates a method of providing power using backup batteries of an LVPDU in accordance with an embodiment. A method 805 of providing power using backup batteries of an LVPDU begins at a step 809 in which an LVPDU provides power using an onboard power source, e.g., a DC-DC converter. The low voltage power may be provided by the onboard power source to a main compute and/or various systems of a vehicle.

In a step 813, a determination is made as to whether the onboard power source is providing sufficient power. That is, it is determined whether the onboard power source is providing enough low voltage power to effectively power systems that the LVPDU is expected to power. If the determination is that the onboard power source provides sufficient power, the LVPDU continues to provide power using the onboard power source in step 809.

Alternatively, if it is determined in step 813 that the onboard power source is not providing sufficient power, the implication is that there may be a performance issue with the onboard power source. By way of example, the onboard power source may effectively be non-functional. Accordingly, process flow moves from step 813 to a step 817 in which the LVPDU switches from providing power using the onboard power source to providing power using a battery arrangement, or a plurality of backup batteries.

After the LVPDU switches to providing power using a battery arrangement, the LVPDU provides power to components in a step 821 such that each battery of the plurality of backup batteries powers a set of particular components. That is, while the power source provided power to an overall set of components and systems, each battery is typically arranged to provide power to subsets of the overall set. Upon the LVPDU providing power to components using backup batteries, the method of providing power using backup batteries is completed.

Figure 9:
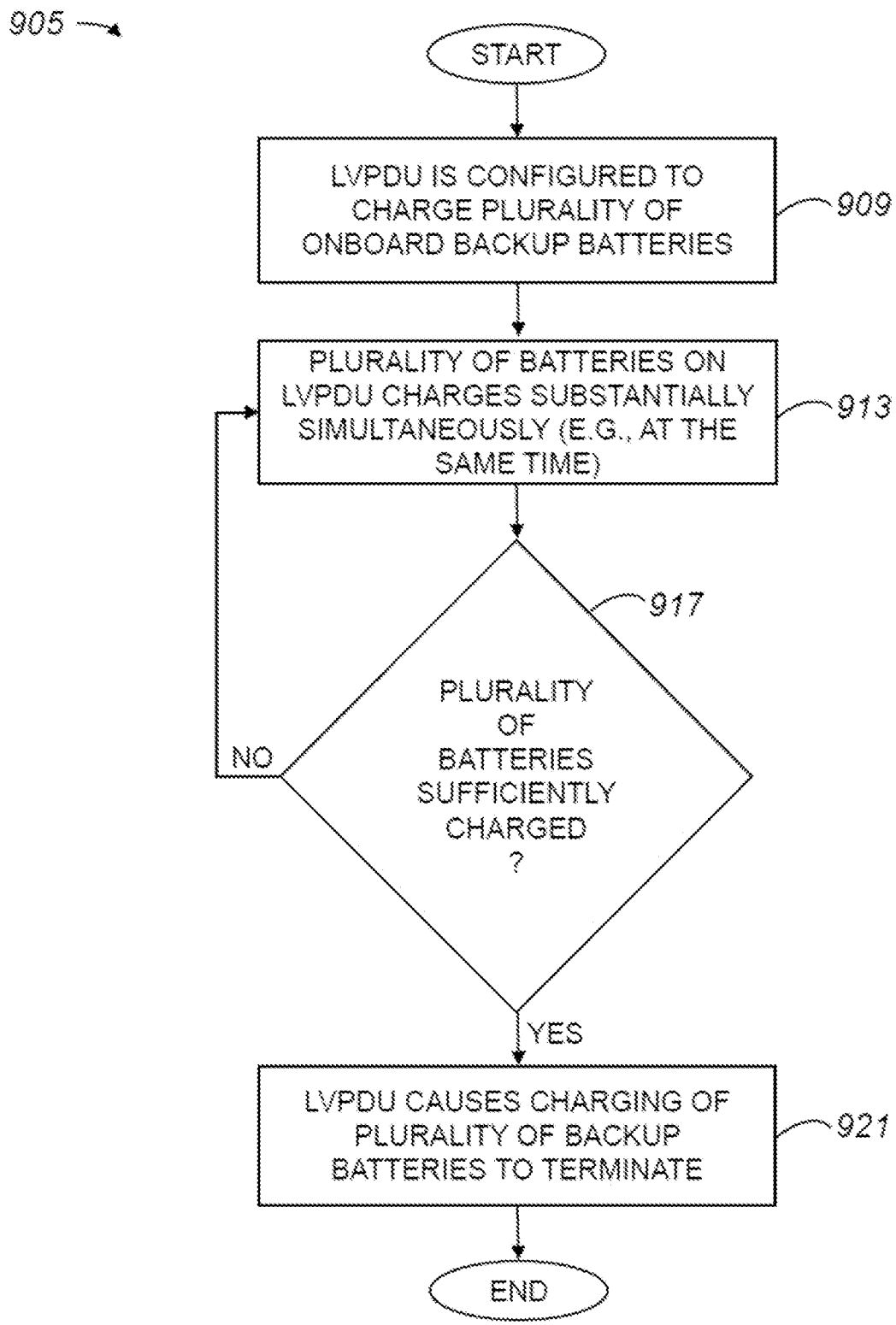
FIG. 9 is a process flow diagram which illustrates a method of charging backup batteries of an LVPDU in accordance with an embodiment.

The backup batteries of an LVPDU may be charged periodically to ensure that the backup batteries hold sufficient power to in the event that the backup batteries are eventually used. In addition, the backup batteries of an LVPDU may be charged when the level of power in the backup batteries is determined to fall below a particular threshold. FIG. 9 is a process flow diagram which illustrates a method of charging backup batteries of an LVPDU in accordance with an embodiment. A method 905 of charging backup batteries onboard an LVPDU begins at a step 909 in which the LVPDU is configured to charge a plurality of onboard backup batteries. In one embodiment, an external power source may be substantially connected to the LVPDU to facilitate charging. In another embodiment, a power supply or source onboard the LVPDU may be configured to charge the backup batteries. That is, charging backup batteries onboard an LVPDU may involve utilizing an external power source or may involve leveraging a power source that is onboard the LVPDU.

In a step 913, the plurality of batteries on the LVPDU are charged substantially simultaneously, e.g., substantially in parallel or at approximately the same time. Charging the batteries substantially simultaneously, rather than serially, allows the batteries to maintain or hold approximately the same amount of power while charging.

A determination is made in a step 917 as to whether the plurality of batteries is sufficiently charged. In other words, it is determined whether each battery has an appropriate or otherwise acceptable charge. If the determination is that the batteries are not sufficiently charged, then process flow returns to step 913 in which the batteries continue to be charged substantially simultaneously.

Alternatively, if the determination in step 917 is that the batteries are sufficiently charged, then the charging of the batteries is terminated in a step 921. Once the LVPDU causes charging of the plurality of backup batteries to terminate, the method of charging backup batteries is completed.

The ability for backup batteries of an LVPDU to essentially take over providing power in the event that a primary power source of the LVPDU is no longer providing power, or is providing insufficient power, is crucial to ensure that a vehicle which includes the LVPDU may continue to operate safely. As such, periodically testing the backup batteries to effectively ensure that the backup batteries are functional increases the likelihood that a vehicle may continue to operate safely in the event that the primary power source ceases to operate as expected. That is, batteries may be tested, e.g., cold tested, to determine if the batteries are in working condition.

Figure 10:
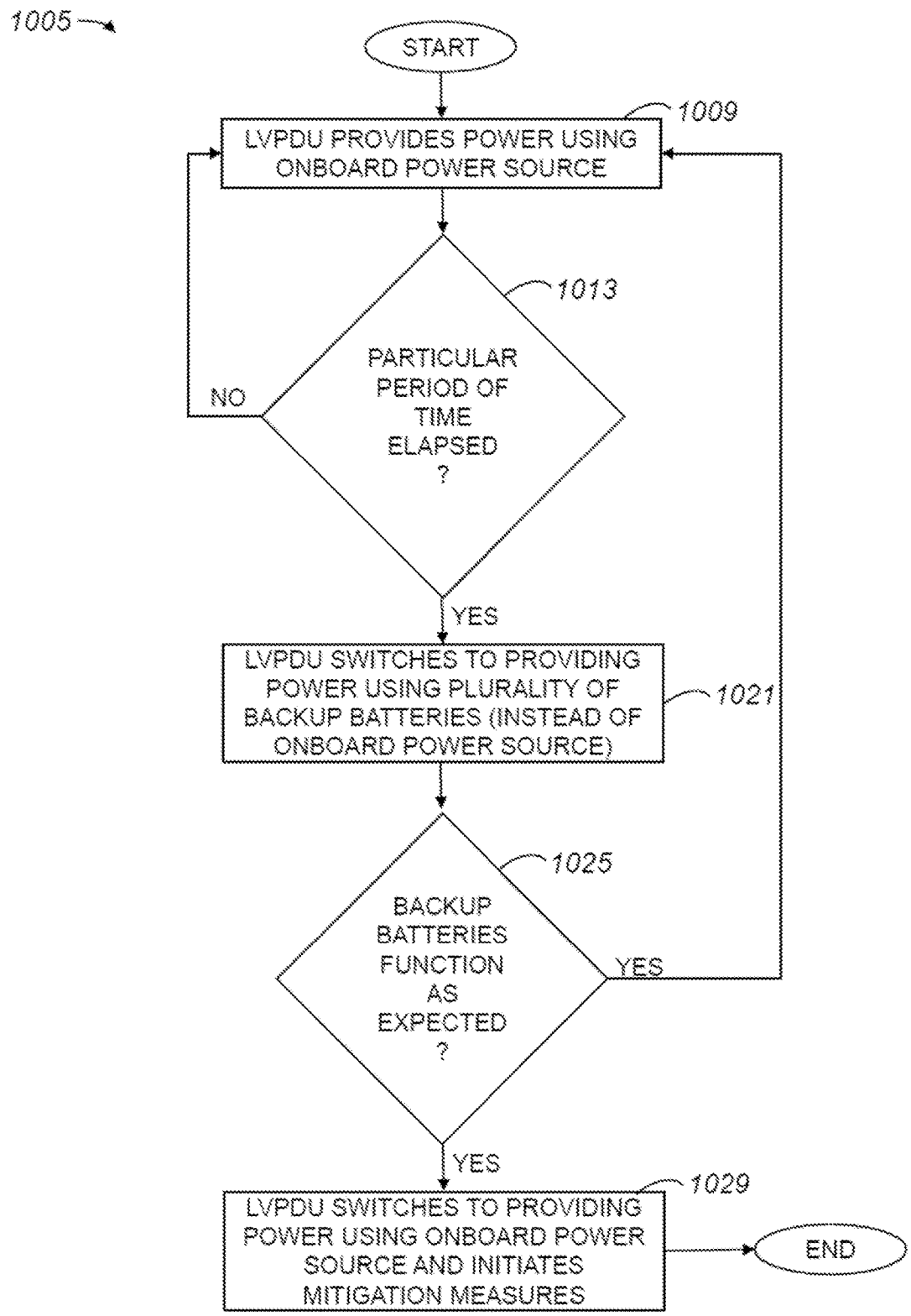
FIG. 10 is a process flow diagram which illustrates a method of testing backup batteries while an LVPDU is in use in accordance with an embodiment.

FIG. 10 is a process flow diagram which illustrates a method of periodically testing backup batteries while an LVPDU is in use in accordance with an embodiment. A method 1005 of periodically testing backup batteries while an LVPDU is in use begins at a step 1009 in which an LVPDU provides power, as for example to a main compute and/or other systems of an autonomous vehicle, using a primary onboard power supply or source.

While the LVPDU provides power using a primary onboard power source, it is determined in a step 1013 whether a particular period of time has elapsed. In one embodiment, backup batteries may be tested when a particular period of time has passed since the last time the backup batteries were tested. Thus, a determination of whether a particular period of time has elapsed may generally be a determination of whether the backup batteries are to be tested or otherwise evaluated.

If it is determined in step 1013 that the particular period of time has not elapsed, the indication is that the backup batteries are not to be tested. As such, the LVPDU continues to provide power using a primary onboard power source in step 1009.

Alternatively, if it is determined in step 1013 that the particular period of time has elapsed, the implication is that the backup batteries are to be tested. Accordingly, process flow proceeds to a step 1021 in which the LVPDU switches to providing power using a plurality of backup batteries rather than the onboard power source. Once power is provided by the plurality of backup batteries, it is determined in a step 1025 whether the backup batteries are functioning as expected. In other words, it is effectively determined whether the backup batteries provide sufficient low voltage power to power components and subsystems they are expected to power.

If the determination in step 1025 is that the backup batteries are functioning as expected, then process flow returns to step 1009 in which the LVPDU once again provides power using an onboard primary power source, e.g., a DC-DC converter. On the other hand, if the determination in step 1025 is that the backup batteries are not functioning as expected, then the indication is that the backup batteries may not be able to provide power in the event that an onboard primary power source is not functioning as expected. If the backup batteries are not function as expected, the LVPDU switches back to providing power using an onboard primary power source in a step 1029, and initiates mitigations measures. The mitigations measures may include, but are not limited to including, measures which allow issues with the backup batteries or, more generally, the LVPDU, to be assessed. In one embodiment, the mitigation measures may be such that the vehicle which includes the LVPDU sends a notification to an enterprise and/or drives until the vehicle can safely come to a stop. Upon the LVPDU switching back to providing power using an onboard power source and initiating mitigation measures, the method of periodically testing backup batteries while an LVPDU is in use is completed.

Figure 11:
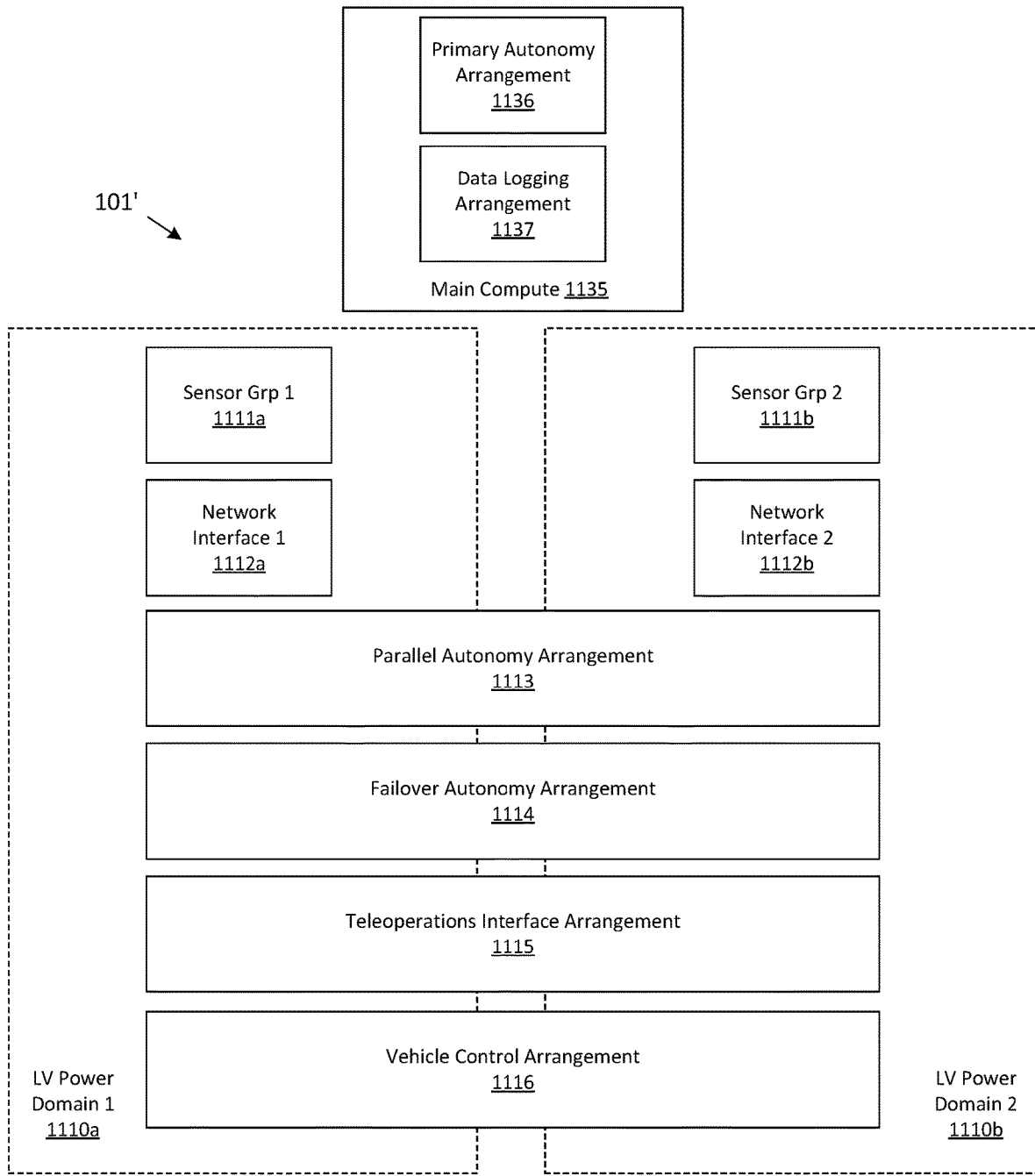
FIG. 11 is a block diagram representation of components of an exemplary autonomous vehicle comprising at least two multiple low voltage domains, in accordance with an embodiment.

FIG. 11 is a block diagram representation of components of an exemplary autonomous vehicle comprising at least two multiple low voltage domains, in accordance with an embodiment. Autonomous vehicle 101' may include, but is not limited to including, a first low voltage power domain 1110a and a second low voltage power domain 1110b. The autonomous vehicle 101' may further include a main compute 1135. Main compute 1135 may generally include a primary autonomy arrangement 1136 and a data logging arrangement 1137. Primary autonomy arrangement 1136 generally includes components, e.g., hardware components and/or software components, which allow a vehicle such as vehicle 101' of FIG. 11 to operate autonomously. Primary autonomy arrangement 1136 may be configured to support autonomous driving at substantially any level defined by the Society of Automotive Engineers (SAE), as for example at Level 3 with conditional driving automation, Level 4 with high driving automation, and/or Level 5 with full driving automation. Data logging arrangement 1137 may include memory which stores data collected as vehicle 101' of FIG. 11 operates. Such data may include, but is not limited to including, perception data and autonomy data. Data logging arrangement 1137 may be configured as a removable storage drive or as a memory from which data may be downloaded, as for example over a wireless connection or over a wired connection such as an Ethernet connection. It should be appreciated that data logging arrangement 1137 may include an input/output port which enables data to be offloaded. In the exemplary embodiment illustrated in FIG. 11, the main compute 1135 is shown to be configured to be outside of the first and second low voltage domains 1110a and 1110b, but it is understood that the main compute 1135 may be configured to be powered using either a high voltage power domain, the first and/or second low voltage power domains 1110a and/or 1110b, and/or another power domain of the autonomous vehicle.

The first low voltage power domain 1110a and the second low voltage power domain 1110b may each be powered by a respective low voltage power distribution unit (LVPDU). As a result, components within the first voltage power domain 1110a may be powered on or off separately and/or independently from components in the second low voltage power domain 1110b. In various embodiments, the components, signal lines, and power lines within the first low voltage power domain 1110a may be arranged in a manner to reduce crosstalk and signal interference with the second low voltage power domain 1110b, and vice versa. In other words, the first low voltage power domain 1110a may be designed to be isolated from the second low voltage power domain 1111b such that when either of the two low voltage power domains 1110a or 1110b is powered off or has faulted, the other may remain functional.

The first low voltage power domain 1110a of the autonomous vehicle 101' may include a first sensor group 1111a and a first network interface 1112a. Similarly, the second low voltage power domain 1110b of the autonomous vehicle 101' may include a second sensor group 1111b and a second network interface 1112b. The first and second sensor groups 1111a and 1111b may include a plurality of sensors to enable the primary autonomy arrangement 1136 to perform functions to operate autonomous vehicle 101' in an autonomous or semi-autonomous manner. The first and second sensor groups 1111a and 1111b may each include one or more of cameras, thermal image sensors (e.g., infrared cameras), light ranging and detection sensors (LiDARs), radars, ultrasonic sensors, microphones, and the like.

In certain embodiments, the first sensor group 1111a and the second sensor group 1111b are designed, configured, and/or arranged in a manner to provide resilience, functionality, and/or redundancy in the event of a failure or fault in one of the low voltage power domains 1110a and 1110b. Sensors of the autonomous vehicle 101' may be divided between the two low voltage power domains 1110a and 1110b (e.g., into the first sensor group 1111a and the second sensor group 1111b) to ensure that even if one of the low voltage power domains (and its associated sensors) fails, the sensors associated with the other of the two low voltage power domains powers may enable primary autonomy arrangement 1136 (or parallel autonomy arrangement 1113 or failover autonomy arrangement 1114) to continue operating the vehicle 101' in an autonomous or semi-autonomous manner or to bring the vehicle 101' to a safe stop. According to one aspect, the sensors of the vehicle 101' may be divided between the two low voltage power domains 1110a and 1110b based on their respective types (e.g., camera, LiDAR, radar, etc.). As one example, the autonomous vehicle 101' may be equipped with two LiDAR sensors and one of the two LiDAR sensors may be powered via the first low voltage power domain 1110a and the second of the two LiDAR sensors may be powered via the second low voltage power domain 1110b. In this manner, if one of the two low voltage power domains fails, the LiDAR sensor powered by the still-functional power low voltage domain may remain operational to provide LiDAR data. In another aspect, the sensors of the autonomous vehicle 101' may also be divided between the two low voltage power domains based on their respective capabilities or functionalities (e.g., long-range sensing vs short-range sensing, high-resolution sensing vs low-resolution sensing, daytime vision vs. low-light sensing, etc.). As an example, the autonomous vehicle 101' may be equipped with a short-range LiDAR, a long-range LiDAR, a short-range radar, and a long-range radar. The autonomous vehicle 101' may be configured such that the short-range LiDAR and the long-range radar are powered by the first low voltage power domain 1110a and the long-range LiDAR and the short-range radar are powered by the second low voltage power domain 1110b. In this manner, both power domains include at least one sensor having long-range detection capability and at least one sensor having short-range detection capability. Furthermore, this enables the vehicle 101' to maintain at least one functional radar and one functional LiDAR in the event that one of the low voltage power domain fails. In yet another aspect, the sensors of the vehicle 101' may be divided between the low voltage power domains 1110a and 1110b to maximize the field of view of each of the sensor groups 1111a and 1111b. In other words, the sensors may be arranged between the first sensor group 1111a and the second sensor group 1111b to minimize or eliminate the blind zone of each of the sensor groups 1111a and 1111b in terms of sensing and detection capability.

The first network interface 1112a and the second network interface 1112b may comprise circuitry and components to enable the vehicle 101' to communicate with one or more servers over a data network. The network interfaces 1112a and 1112b may comprise, for example, one or more cellular radios and modems which support communications over 3G/4G/LTE/5G networks. The network interfaces 1112a and 1112b may communicate with the one or more servers for a variety of purposes including but not limited to uploading sensor data (e.g., to train machine-learned models for operating the primary autonomy arrangement 1136, to enable the one or more servers to determine and maintain real-time status of the autonomous vehicle 101', etc.), retrieving map data, and supporting teleoperations. Depending on the particular implementation, the network interfaces 1112a and 1112b may be configured to communicate concurrently over different wireless communication bands (e.g., using carrier aggregation) or over separate data networks (e.g., multi-cellular service provider aggregation) to improve data bandwidth and throughput. In other implementations, one of the network interfaces 1112a and 1112b may function as the primary network interface while the other serves as the backup. In yet another implementation, the network interfaces 1112a and 1112b may be enabled or disabled (e.g., put into a standby mode) based on the wireless data signal conditions and data throughput of each of the network interfaces 1112a and 1112b.

The autonomous vehicle 101' may further include a parallel autonomy arrangement 1113, which may perform at least a subset of the functions (or substantially the same functions) performed by the primary autonomy arrangement 1136. In one embodiment, the parallel autonomy arrangement 1113 may be configured to execute in parallel with the primary autonomy arrangement 1136 and may take over control of the autonomous vehicle 101' or override the output from the primary autonomy arrangement 1113 (e.g., in the event that the primary autonomy trajectory for the vehicle 101' is determined to be unsafe). Although the example illustrated in FIG. 11 shows the parallel autonomy arrangement 1113 as being implemented outside the main compute 1135, it is understood that in certain implementations, the parallel autonomy arrangement 1136 may be implemented by the main compute 1135. The autonomous vehicle 101' may also include a failover autonomy arrangement 1114, which may be configured to substantially institute failover measures in the event of an issue that prevents the primary autonomy arrangement 1136 and/or the parallel autonomy arrangement 1113 from controlling the autonomous vehicle 101'. For example, failover autonomy arrangement 1114 may cause the autonomous vehicle 101' to make a safe stop (e.g., pull over on the side of the road) if the vehicle is unable to safely operate under autonomy, e.g., in an autonomous mode or state.

The autonomous vehicle 101' may additionally include teleoperations interface arrangement 1115, which may be configured to enable communications between a teleoperations system and autonomous vehicle 101'. Teleoperations interface arrangement 1115 may provide camera streams, or data streams from cameras (e.g., cameras within the first and second sensor groups 1111a and 1111b), to a teleoperations system or a system which may remotely operate autonomous vehicle 101'. In one embodiment, teleoperations interface arrangement 1115 includes hardware and/or software which process data obtained from cameras, enables a remote teleoperator to control vehicle operations, and may support communications with the remote teleoperator through network interfaces 1112a and 1112b. By way of example, one or more radios and modems included in network interfaces 1112a and 1112b may be used by teleoperations interface arrangement 1115 to allow for communications between teleoperations interface arrangement 1115 and a teleoperations system. Such communications may generally include, but are not limited to including, sending data streams from cameras to a teleoperations system and receiving control commands from the teleoperations system to control the autonomous vehicle 101'.

According to embodiments, the vehicle 101' may further include vehicle control arrangement 1116, which may include a brainstem computer (e.g., BSC 446 of FIG. 4) as well vehicle control components such as motor control circuitry, brake actuators, steering actuators, emergency stop mechanisms, etc. The vehicle control arrangement 1116 may control the vehicle in response to trajectories and/or commands received from one or more of primary autonomy arrangement 1136, parallel autonomy arrangement 1113, failover autonomy arrangement 1114, and teleoperations interface arrangement 1115. For instance, a vehicle trajectory may be received from teleoperations interface arrangement 1115, which generates the vehicle trajectory based on remote operator inputs and commands. The BSC may convert the received vehicle trajectory into control signals which may cause the motor control components to function to control the vehicle in a manner that is consistent with the determined vehicle trajectory and the remote operator input and commands.

In the example illustrated in FIG. 11, the parallel autonomy arrangement 1113, failover autonomy arrangement 1114, teleoperations interface arrangement 1115, and vehicle control arrangement 1116 is each shown to span both the first low voltage power domain 1110a and the second low voltage power domain 1110b. This may be used to refer to, for example, each of these elements being implemented by hardware that may receive power from either the first low voltage power domain 1110a or the second low voltage power domain 1110b, or both. In the event of an issue with one of the power domains, each of these elements (or at least some components of each of these elements) may be powered by the other power domain and may retain at least a subset of its normal operation functionalities. For instance, the failover autonomy arrangement 1114 may, for example, selectively receive power from either the first low voltage power domain 1110a or the second low voltage power domain 1110b so as to remain operational during an outage relating to one of the two low voltage power domains. In addition or as an alternative, the failover autonomy arrangement 1114, for example, may be implemented by a plurality of components, a first set of which are powered by the first low voltage power domain 1110a and a second set of which are powered by the second low voltage power domain 1110b. The failover autonomy arrangement 1114 may be configured in such a manner such that, in the event of an outage of the first low voltage power domain, the second set of components may perform at least a subset of failover autonomy functionalities to enable the failover autonomy arrangement 1114 to control autonomous vehicle 101'. In one implementation, the parallel autonomy arrangement 1113 and/or the failover autonomy arrangement 1114 may be implemented by four general-purpose processors or systems on a chip (SoCs) and two of the SoCs may be powered via the first low voltage power domain 1110a and two of the SoCs may be powered via the second low voltage power domain 1110b. In another implementation, a first SoC in the first low voltage power domain 1110a may actively implement the parallel autonomy arrangement 1113 and/or the failover autonomy arrangement 1114, while a second SoC in the second low voltage power domain 1110b may be in standby to implement the parallel autonomy arrangement 1113 and/or the failover autonomy arrangement 1114. In response to detecting a power fault in the first low voltage power domain 1110a, the second SoC may be triggered to begin active implementation of the parallel autonomy arrangement 1113 and/or the failover autonomy arrangement 1114.

Figure 12:
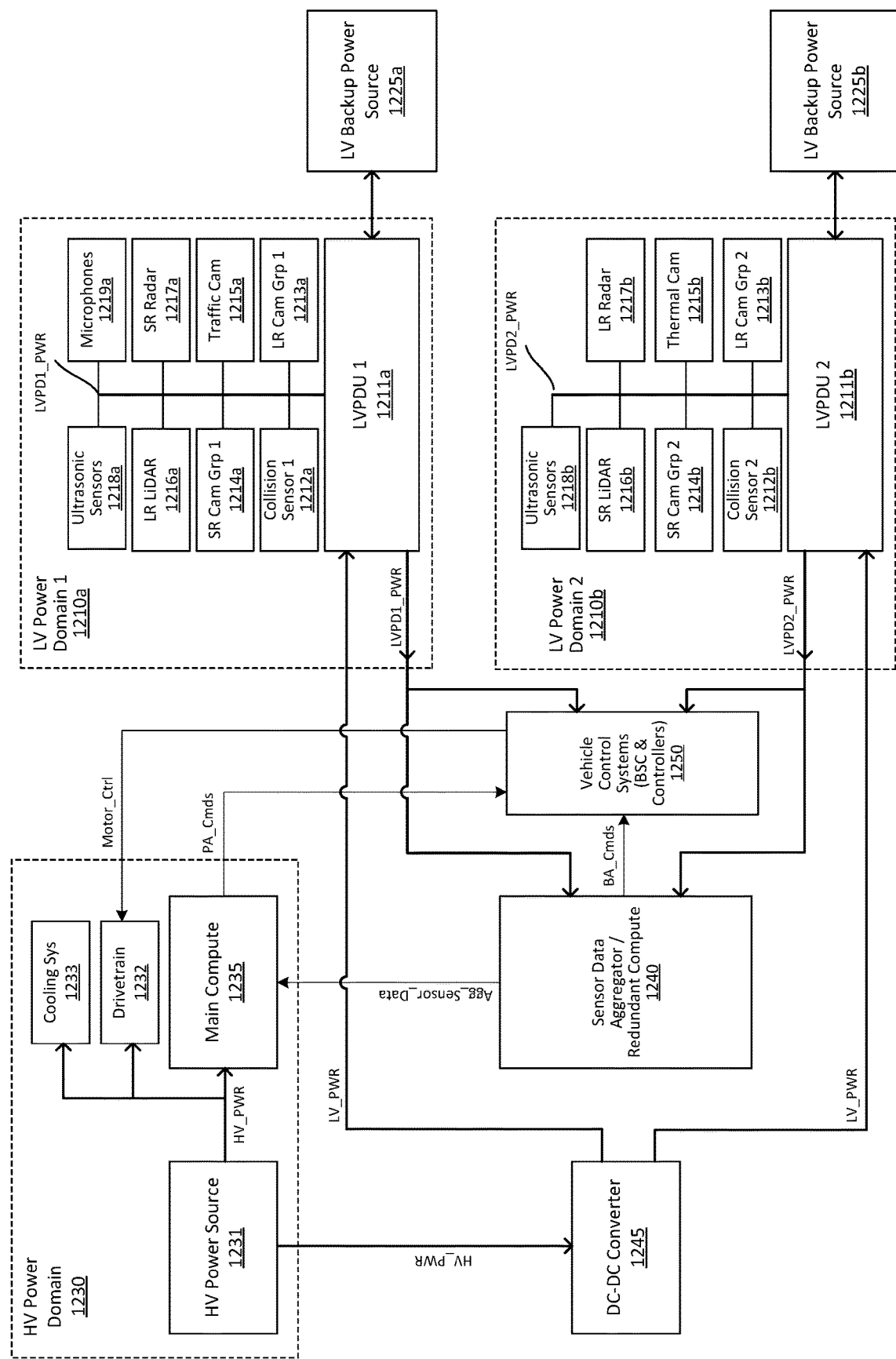
FIG. 12 is another block diagram illustrating components of an exemplary autonomous vehicle, in accordance with an embodiment.

FIG. 12 is another block diagram illustrating components of an exemplary autonomous vehicle, in accordance with an embodiment. FIG. 12 may be a more detailed illustration of the components depicted in FIG. 11. For instance, the low voltage power domains 1110a and 1110b of FIG. 11 may correspond to low voltage power domains 1210a and 1210b, respectively. And the main compute 1135 of FIG. 11 may correspond to main compute 1235 of FIG. 12.

In the example illustrated in FIG. 12, an autonomous vehicle (e.g., such as autonomous vehicle 101' of FIG. 11) may comprise a first low voltage power domain 1210a, a second low voltage power domain 1210b, and a high voltage power domain 1230. The high voltage power domain 1230 may be powered by a high voltage power source 1231, which may be a high voltage battery on-board the autonomous vehicle. The high voltage power source 1231 may provide high voltage power (HV_PWR) to the drivetrain 1232 and cooling system 1233 of the autonomous vehicle and a main compute 1235. The cooling system 1233 may be configured to, for example, cool components on-board the autonomous vehicle, including the high voltage power source 1231, the drivetrain 1232, and the main compute 1235. The main compute 1235 may be configured to implement a broad set of functions to control the autonomous vehicle, including for example, autonomously operating and navigating the vehicle (e.g., in accordance with Level 4 or Level 5 autonomous driving). For instance, as described with respect to FIG. 11, the main compute 1235 may correspond to main compute 1135 of FIG. 11 and implement primary autonomy arrangement 1136 of FIG. 11 to control the autonomous vehicle in an autonomous or semi-autonomous manner. And although illustrated in FIG. 12 as part of the high voltage power domain 1230, the main compute 1235 may instead be part of a low voltage power domain (e.g., a third low voltage power domain (not shown) separate from the first and second low voltage domains 1210a and 1210b). In certain embodiments, parts or components of the high voltage power domain 1235 may be powered, either entirely or partially, by low voltage power supplied by one or more of the low voltage power domains 1210a and/or 1210b. For instance, a battery management system (BMS, not shown) that manages the charging and discharging of the high voltage power source 1231 may be powered by the first low voltage power domain 1210a and/or the second low voltage power domain 1210b.

The autonomous vehicle may include a DC-DC converter 1245 that converts high voltage power from the high voltage power source 1231 (HV_PWR) to a lower voltage power (LV_PWR). This lower voltage power may be supplied to the low voltage power domains 1210a and 1210b to power these power domains during normal operations of the autonomous vehicle. Although FIG. 12 illustrates that a single DC-DC converter 1245 is coupled to both the first low voltage power domain 1210a and the second low voltage power domain 1210a, it is understood that separate DC-DC converters may be used to power the low voltage domains 1210a and 1210b.

The first low voltage power domain 1210a may include a first low voltage power distribution unit (LVPDU) 1211a, which may be configured to receive the low voltage power (LV_PWR) from the DC-DC converter 1245 and to supply low voltage power (LVPD1_PWR) to each of the components with the first low voltage power domain 1210a. Among other functionalities, LVPDU1 may be configured to regulate the low voltage power that it supplies within the first low voltage power domain 1210a, detect power error conditions or failures (e.g., a short circuit, voltage irregularities, etc.), and isolate any detected power error conditions, faults, or failures to prevent wider outages of autonomous vehicle system components. For instance, the first LVDPU 1211a may be configured to isolate an individual component or a set of components within the first low voltage power domain 1210a if it detects that the component(s) are drawing an abnormal amount of current. In an example, the first LVDPU 1211a may be configured to selectively disconnect the first power domain 1210a from the DC-DC converter 1245 by way of a power switch within the first LVPDU (not shown in FIG. 12). The first LVPDU 1211a may do so in response to detected irregularities in the LV_PWR output by the DC-DC converter 1245. Once disconnected from LV_PWR, the components in the first low voltage power domain 1211a may continue to operate using low voltage power supplied by a low voltage backup power source 1225a (e.g., a 12V battery). The second low voltage power domain 1210b may similarly include a second LVPDU 1211b, which may be substantially the same as the first LVPDU 1211a. In some examples, the first low voltage power domain 1210a and the second low voltage power domain 1210b may have the same operating voltage (e.g., 12V). In other examples, the two power domains may operate on different voltages. Additional details relating to example implementations of the LVPDU 1211a and 1211b are described with respect to FIGS. 13A and 13B.

Components of the autonomous vehicle that are within the first low voltage power domain 1211a may include a first group of collision sensor 1212a, a first group of long-range cameras 1213a, a first group of short-range cameras 1214a, a traffic camera 1215a, a long-range LiDAR 1216a, a short-range radar 1217a, ultrasonic sensors 1218a, and microphones 1219a. Components of the autonomous vehicle that are within the second low voltage power domain 1211b may include a second group of collision sensors 1212b, a second group of long-range cameras 1213b, a second group of short-range cameras 1214b, a thermal camera 1215b (e.g., infrared camera), a short-range LiDAR 1216b, a long-range radar 1217b, and ultrasonic sensors 1218b.

Referring back to FIG. 11, the sensors within the first low voltage power domain 1210a (e.g., 1212a to 1219a) may comprise the first sensor group 1111a of FIG. 11 and the sensors within the second low voltage power domain 1210b (e.g., 1212b to 1218b) may comprise the second sensor group 1111b of FIG. 11. In various implementations, the first sensor group 1111a and the second sensor group 1111b are arranged such that either of the two sensor groups may provide sufficient sensor data regarding the surroundings of the vehicle to enable the vehicle to operate (e.g., continue autonomous driving operations, operate via a teleoperations interface, make a safe stop, etc.) if one of the two low voltage power domains fails. To that end, the sensors of the autonomous vehicle may be divided between the two low voltage power domains 1210a and 1210b based on their respective types (e.g., lidar vs radar vs camera, etc.), capabilities (e.g., short-range vs long range sensing capability, high-resolution vs low-resolution sensing capability, etc.), and/or directions and/or fields of view. For instance, as illustrated in FIG. 12, the first sensor group includes long-range lidar 1216a and short-range radar 1217a while the second sensor group includes short-range lidar 1216b and long-range radar 1217b.

The autonomous vehicle may further include a sensor data aggregator/redundant compute (SDA) 1240 for processing and aggregating the sensor data collected by the sensors, such as sensors 1212a through 1219a and 1212b through 1219b. The sensor data aggregator 1240 may transmit the aggregated sensor data (Agg_Sensor_data) to the main compute 1235 and/or the processor(s) 1212a and 1212b. According to one aspect, the sensor data aggregator 1240 may be configured to, for example, combine images captured by the various cameras on-board the autonomous vehicle (e.g., by timestamping the images and stitching the images captured at the same time by different cameras) to enable the main compute 1235 to perform autonomy operations or to enable the vehicle to be operated via teleoperations. The sensor data aggregator 1240 may be powered via either the first low voltage power domain 1210a and/or the second low voltage power domain 1210b.

Referring back again to FIG. 11, the SDA 1240 may implement the parallel autonomy arrangement 1113, the failover autonomy arrangement 1114, and/or the teleoperations interface arrangement 1115 of FIG. 11. The SDA 1240 may comprise processors, systems on chip (SoCs), or systems on module (SOMs) to implement the aforementioned functionalities. In some implementations, the SDA 1240 may include two computing assemblies, each with one or more processors or SoCs. The implementation of parallel autonomy arrangement 1113 and/or failover autonomy arrangement 1114 may be performed by one of the two computing assemblies of the SDA 1240. The other of the two computing assemblies of the SDA 1240 may standby to perform parallel autonomy functionalities and/or failover autonomy functionalities in the event of a failure. The two computing assemblies may also contemporaneously execute instructions to implement the teleoperations interface arrangement 1115.

According to embodiments, the SDA 1240 may be powered by both the first LVPDU 1211*a* and the second LVPDU 1211*b*. In other words, the SDA 1240 may span both the first low voltage power domain 1210*a* and the second low voltage power domain 1210*b*. The first computing of the SDA 1240 may be powered by the first LVDU 1211*a* and the second computing assembly of the SDA 1240 may be powered by the second LVDU 1211*b*. The first computing assembly may process the sensor data generated by the sensors 1212*a* to 1219*a*. And the second computing assembly may process the sensor data generated by sensors 1212*b* to 1218*b*. In this manner, even if one of the low voltage power domains fails, sensor data from the still-functioning sensors may be processed and used to implement one or more of: primary autonomy functionalities, parallel autonomy functionalities, failover autonomy functionalities, and/or teleoperations functionalities.

Similarly, vehicle control systems 1250, which may include the brainstem computer of the vehicle and other vehicle control elements, may also span both low voltage domains 1210*a* and 1210*b*. The vehicle control systems 1250 may receive commands and/or vehicle trajectories (e.g., PA_Cmds) generated by primary autonomy by way of the primary compute 1235 to output signals to control steering actuators, drivetrain motors, brake actuators, and emergency stop mechanisms of the vehicle. For instance, the vehicle control systems 1250 may generate a motor control signal (e.g., Motor_Ctrl) to control the drivetrain 1232. The vehicle control systems 1250 may also receive backup autonomy commands (e.g., BA_Cmds) from the SDA 1240 to generate the control signals. The backup autonomy commands may override the primary autonomy commands. As illustrated in FIG. 12, the vehicle control systems 1250 may be powered by both the first LVPDU 1210*a* and the second LVPDU 1210*b*. In the event of a fault or failure with one of the low voltage power domains, the vehicle control systems 1250 may remain operational to control the drivetrain, steering, and brakes of the vehicle.

Figure 13:
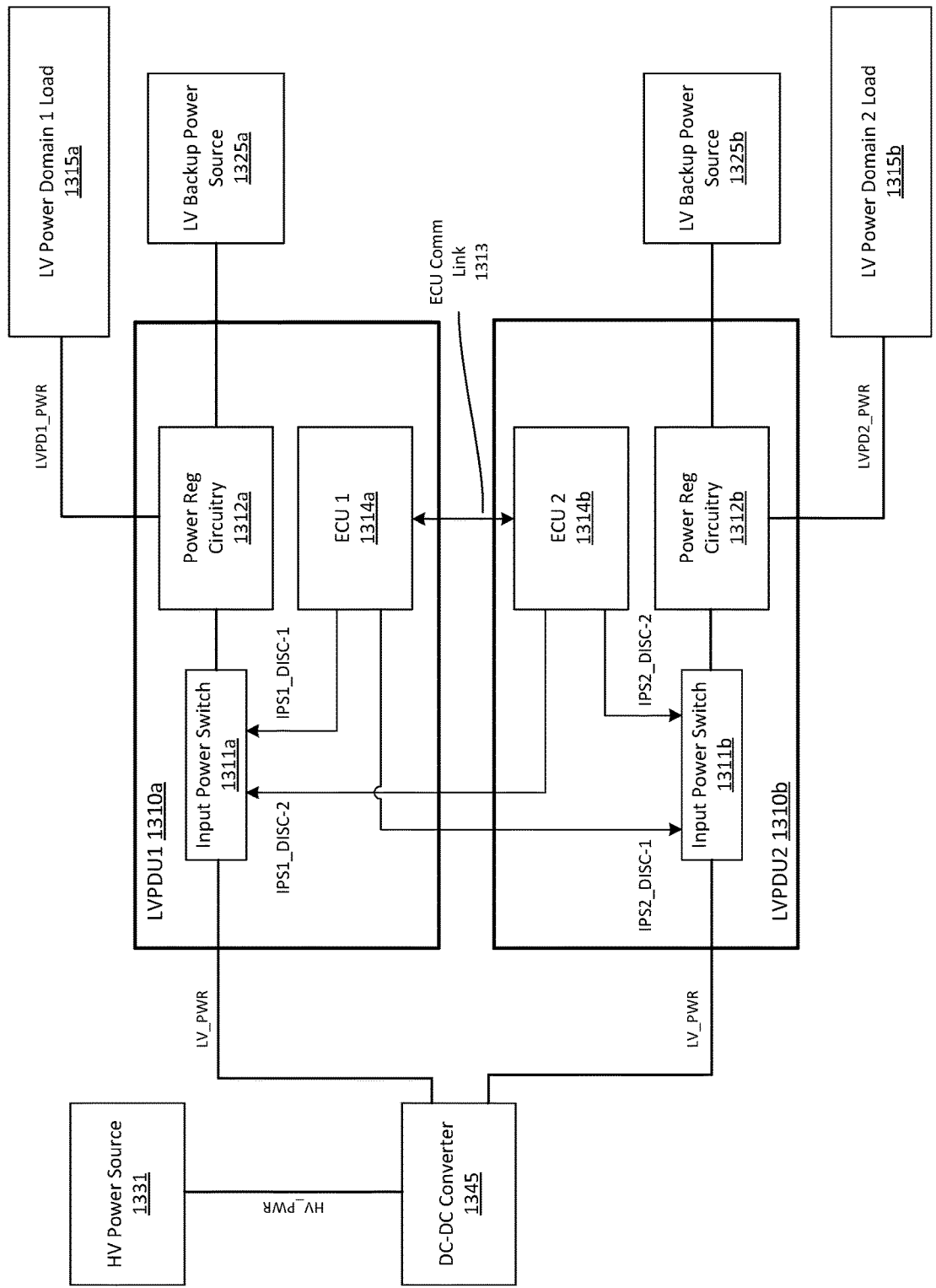
FIG. 13 is another block diagram illustrating components of an exemplary autonomous vehicle, in accordance with an embodiment.

FIG. 13 is another block diagram illustrating components of an exemplary autonomous vehicle, in accordance with an embodiment. The autonomous vehicle, such as autonomous vehicle 101' of FIG. 4, may include a high voltage power source 1331, a DC-DC converter 1345, a first LVPDU 1310*a*, a second LVPDU 1310*b*, a first low voltage backup power source 1325*a*, and a second low voltage backup power source 1325*a*. The components illustrated in FIG. 13 may be referenced with respect to those illustrated in FIG. 12. For instance, the first low voltage power domain load 1315*a* may correspond to components within the first low voltage power domain 1210*a*. Similarly, the second low voltage power domain load 1315*b* may correspond to components within the second low voltage power domain 1210*b*. The high voltage power source 1331 may be a high voltage battery (e.g., a 350V battery) that may serve as the autonomous vehicle's primary power source. The high voltage power (HV_PWR) supplied by the high voltage power source 1331 may be converted to lower voltages for use by low voltage power domains by way of one or more DC-DC converters 1345, which may output a low voltage power (LV_PWR).

In an example, the first LVPDU 1310*a* may include a input power switch 1311*a*, power regulation circuitry 1312*a*, and an error control unit (ECU) 1314*a*. The second LVPDU 1310*b* and its components may be configured substantially similarly as compared to the first LVPDU 1310*a*. For instance, the second LVPDU 1310*b* may similarly include a input power switch 1311*b*, power regulation circuitry 1312*b*, and an ECU 1314*b*.

With respect to the first LVPDU 1310*a*, the input power switch 1311*a* may couple the first LVPDU 1310*a* to the output of the DC-DC converter 1345 to receive LV_PWR. The power regulation circuitry 1312*a* receives the LV_PWR and generates a low voltage power signal (LVPD1_PWR) for powering components of the first low voltage power domain (e.g., first low voltage power domain load 1315*a*). Depending on the implementation, the power regulation circuitry 1312*a* may be configured to, for example, regulate the current and voltage of LVPD1_PWR. In certain examples, the power regulation circuitry 1312*a* may be configured to selectively turn off power to an individual component (e.g., a particular sensor, etc.) within the first low voltage power domain based on detected power irregularities of that individual component (e.g., abnormally high current draw, etc.). In this manner, for example, a fault such as a short circuit condition of one component within the first low voltage power domain may be contained such that other components within the first low voltage power domain are not affected.

According to embodiments, the input power switch 1311*a* (and the input power switch 1311*b*) may be closed by default (e.g., under normal operating conditions) to couple the DC-DC converter 1345 to the first LVPDU 1310*a* to enable the DC-DC converter 1345 to supply low voltage power to the first LVPDU 1310*a*. Under such conditions, the low voltage backup power source 1325*a* may be coupled to the first LVDPU 1310*a* to receive a charging current. Input power switch 1311*b* may similarly be operated to couple the DC-DC converter 1345 to the second LVPDU 1310*b*. And although not illustrated in FIG. 13, it is understood that switches and/or other circuitry may be included in the LVPDUs to selectively de-couple the low voltage backup power sources 1325*a* and 1325*b* from the LVPDUs 1310*a* and 1310*b*. When errors, abnormalities, or failures are detected, the input power switch 1311*a* and/or the input power switch 1311*b* may be opened to disconnect the first LVPDU 1310*a* and/or the second LVPDU 1310*b* from the DC-DC converter 1345. For instance, during normal operations (e.g., when the autonomous vehicle, including its high voltage power domain(s), DC-DC converter(s), and low voltage power domain(s), are operating using power supplied by the high voltage power source), the input power switch 1311*a* of the first LVDPU 1310*a* may be closed to couple the first LVPDU 1310*a* to the DC-DC converter 1345 and the DC-DC converter 1345 may supply low voltage power to the first low voltage power domain. In the event that the first low voltage power domain needs to be switched to backup power, the input power switch 1311*a* may be opened and the first LVPDU 1310*a* may be reconfigured to be powered by the first low voltage backup power source 1325*a*. In a similar fashion, the second LVPDU 1310*a* may be reconfigured to be powered by the second low voltage backup power source 1325*b*.

According to embodiments, the ECU 1314*a* of the first LVPDU 1310*a* may be configured to monitor various operating conditions within the high voltage power domain, the first low voltage power domain, and/or the second low voltage power domain to control the input power switch 1311*a* of the first LVPDU 1310*a*. Similarly, the ECU 1314*b* of the second LVPDU 1310*b* may control the input power switch 1311*b* of the second LVPDU 1310*b*. In the example illustrated in FIG. 13, the first ECU 1314*a* may generate one or more of: (i) control signal IPS1-DISC-1 to disconnect the input power switch 1311*a* of the first LVPDU 1310*a* from the DC-DC converter 1345, and (ii) control signal IPS2_DISC-1 to disconnect the input power switch 1311*b* of the second LVDPU 1310*b* from the DC-DC converter 1345. Similarly, the second ECU 1314*b* may generate one or more of: (i) control signal IPS1_DISC-2 to disconnect the input power switch 1311*a* of the first LVPDU 1310*a* from the DC-DC converter 1345, and (ii) control signal IPS2_DISC-2 to disconnect the input power switch 1311*b* of the second LVDPU 1310*b* from the DC-DC converter 1345.

In one or more embodiments, the first and second ECU's 1314*a* and 1314*b* may establish a communication link 1313 to exchange sensor data and status information. The communication link may be implemented as, for example, an I2C bus, a controller area network (CAN) bus, and the like. In addition, requests to control input power switches 1311*a* and 1311*b* (or any other aspects of the LVPDU) may be transmitted over the communication link 1313. For example, the first ECU 1314*a* may detect a fault or failure associated with the high voltage power domain or the DC-DC converter 1345. In response to detecting the fault or failure, the first ECU 1314*a* may transmit a request to the second ECU 1314*b* to open the second input switch 1311*b*. In response to receiving the request, the second ECU 1314*b* may open the second input switch 1311*b* to disconnect the second LVPDU 1310*b* and the second low voltage power domain from the DC-DC converter 1345. In this manner, the LVPDUs 1310*a* and 1310*b* may redundantly monitor for errors to selectively open the input power switches 1311*a* and 1311*b*.

Figure 14A:
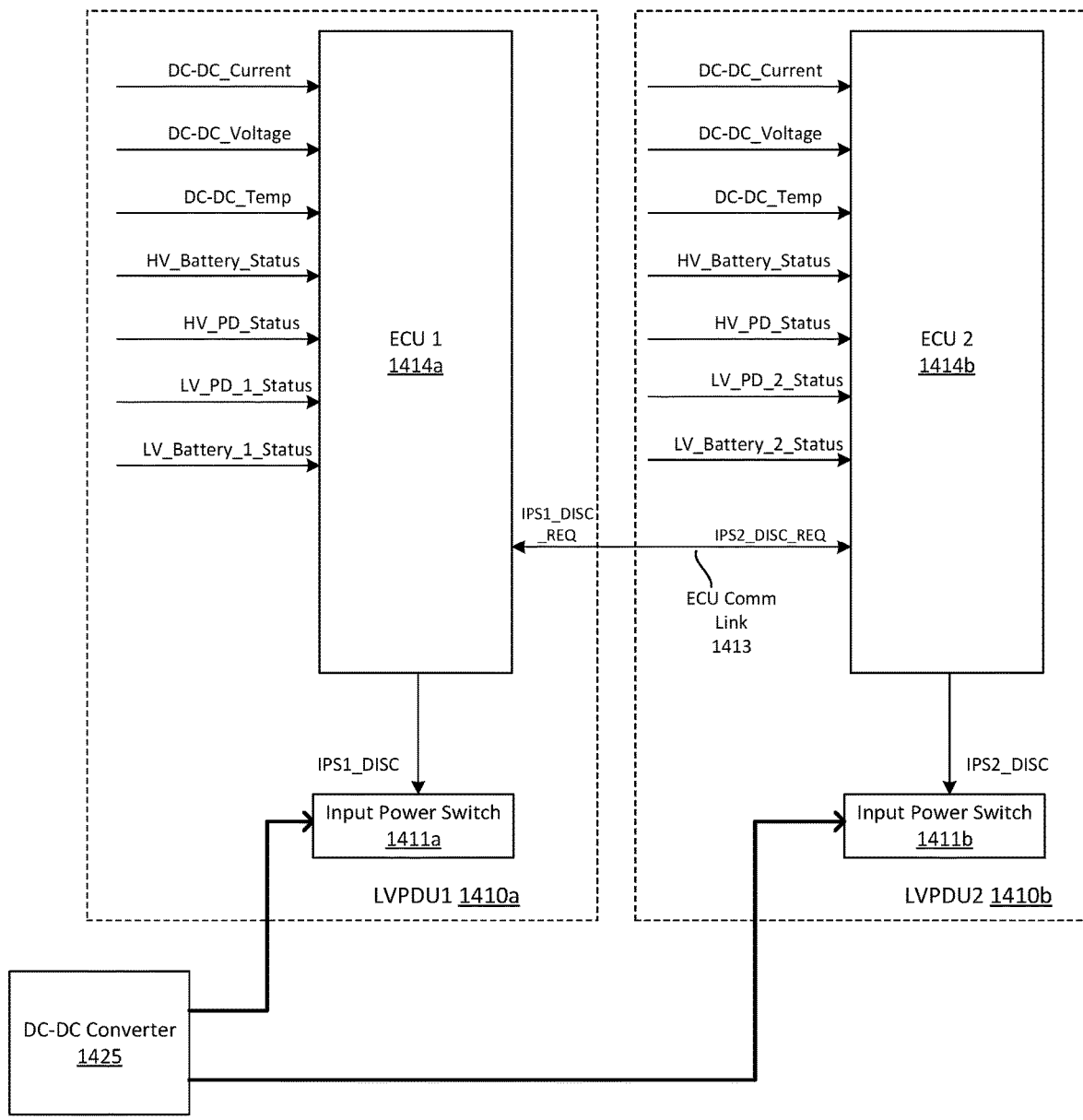
FIG. 14A is a block diagram illustrating an example of an error control unit (ECU) of a low voltage power distribution unit, in accordance with an embodiment.
Figure 14B:
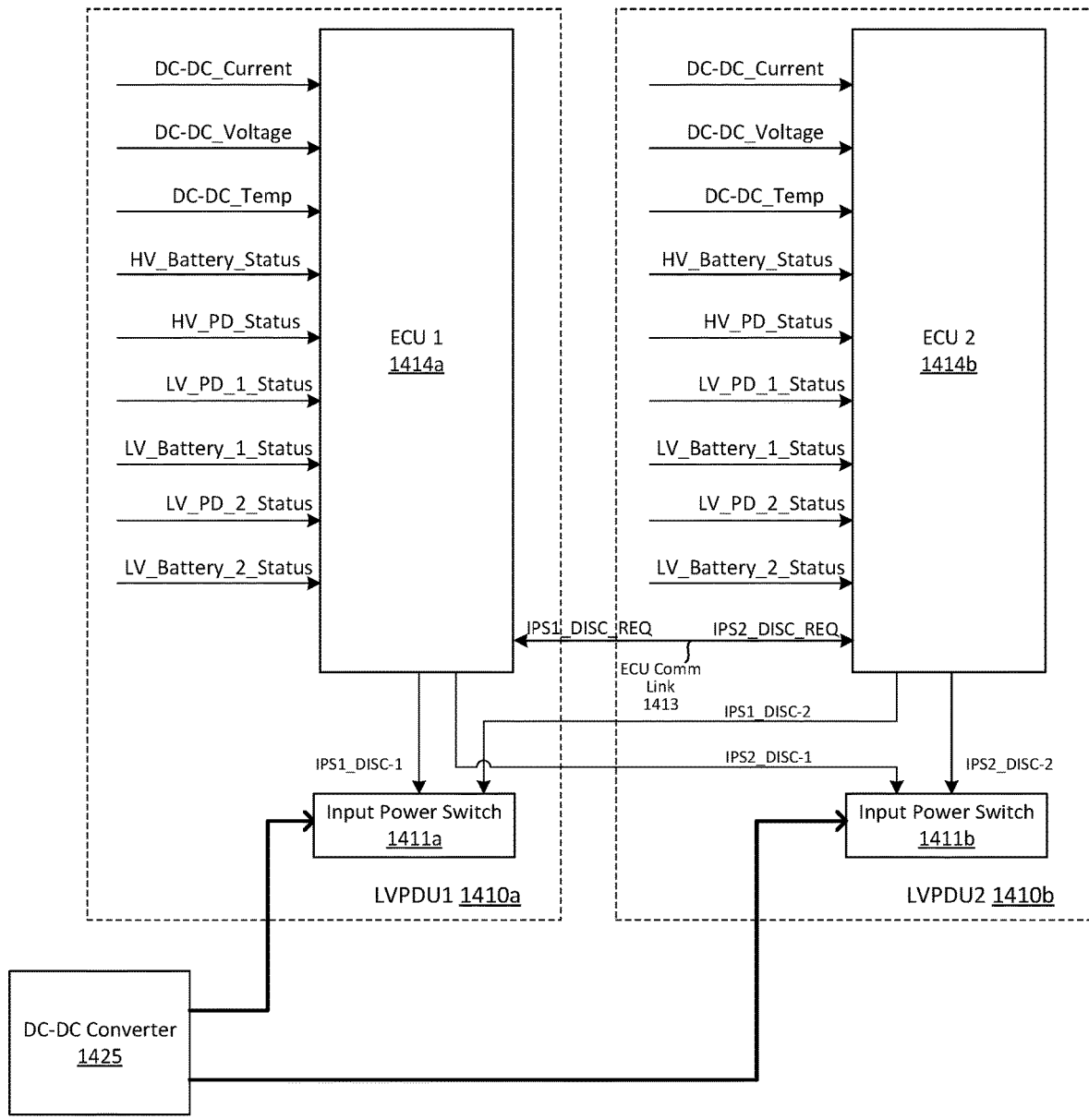
FIG. 14B is another block diagram illustrating an example of an error control unit (ECU) of a low voltage power distribution unit, in accordance with an embodiment.
Figure 14C:
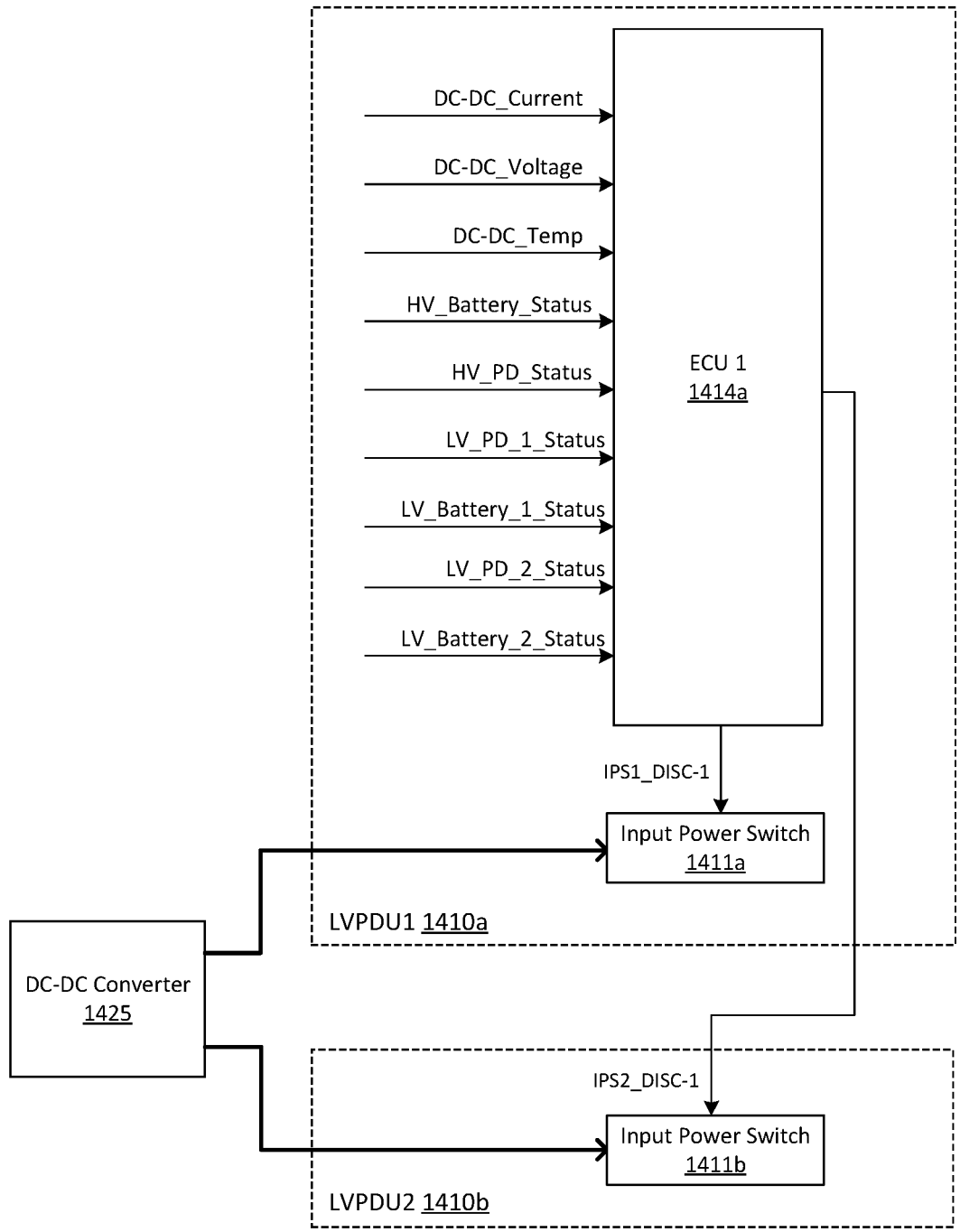
FIG. 14C is yet another block diagram illustrating an example of an error control unit (ECU) of a low voltage power distribution unit, in accordance with an embodiment.

FIGS. 14A through 14C are block diagrams illustrating examples of error control units (ECUs) that controls at least one input power switch that selectively connects and disconnects an LVPDU from a DC-DC converter, in accordance with an embodiment. In general, the ECUs 1414*a* and 1414*b* illustrated in and described with respect to FIGS. 14A through 14C may correspond to examples such as ECUs 1314*a* and 1314*b* of FIG. 13. In particular, the ECUs 1414*a* and 1414*b* may be arranged in various configurations as illustrated in FIGS. 14A through 14C to control input power switches of one or more LVPDUs.

Referring to FIG. 14A, the ECU 1414*a* of the first LVPDU 1410*a* controls the input power switch 1411*a* of the first LVPDU 1410*a* and the ECU 1414*b* of the second LVPDU 1410*b* controls the input power switch 1411*b* of the second LVPDU 1410*b*. Furthermore, ECU 1414*a* and ECU 1414*b* may each independently monitor for fault conditions. As illustrated in FIG. 14A, ECU 1414*a* of the first LVPDU 1410*a* is configured to generate control signal IPS1_DISC to open input power switch 1411*a* to disconnect the first LVPDU 1410*a* and the first low voltage power domain from the DC-DC converter (and from the high voltage battery). ECU 1414*b* of the second LVPDU 1410*b* is configured to generate control signal IPS2_DISC to open input power switch 1411*b* to disconnect the second LVPDU 1410*b* and the second low voltage power domain from the DC-DC converter (and from the high voltage battery).

For example, ECU 1414*a* may generate control signal IPS1_DISC to disconnect the input power switch 1411*a* of the first LVPDU 1410*a* based at least in part on one or more of: output current of the DC-DC converter (DC-DC_Current), output voltage of the DC-DC converter (DC-DC_Voltage), a temperature of the DC-DC converter (DC-DC_Temp), a status of the high voltage battery HV_Battery_Status, a status of the high voltage power domain (HV_PD_Status), a status of the first low voltage power domain (LV_PD_1_Status), a status of the first low voltage backup battery (LV_Battery_1_Status), and the like. Similarly, ECU 1414*b* may generate control signal IPS2_DISC to disconnect the input power switch 1411*b* of the second LVPDU 1410*b* based at least in part on one or more of: output current of the DC-DC converter (DC-DC_Current), output voltage of the DC-DC converter (DC-DC_Voltage), a temperature of the DC-DC converter (DC-DC_Temp), a status of the high voltage battery HV_Battery_Status, a status of the high voltage power domain (HV_PD_Status), a status of the second low voltage power domain (LV_PD_2_Status), a status of the second low voltage backup battery (LV_Battery_2_Status), and the like.

In addition, the ECUs 1414*a* and 1414*b* may establish a communication link 1413 to, for instance, exchange sensor data and transmit requests to operate the input power switches 1411*a* and 1411*b*. As an example, in response to detecting a fault at the output of the DC-DC converter 1425, the ECU 1414*a* of the first LVPDU 1410*a* may transmit a request such as IPS_DISC_REQ to the ECU 1414*b* of the second LVPDU 1410*b* of the second LVPDU 1410*b* to cause the ECU 1414*b* to open the input power switch 1411*b* to disconnect the second LVPDU 1410*b* from the DC-DC converter 1425. Similarly, the ECU 1414*b* may transmit a request IPS1_DISC_REQ to cause ECU 1414*a* to open the input power switch 1411*a* of the first LVPDU 1410*a*.

Referring to FIG. 14B, ECU 1414*a* of the first LVPDU 1410*a* and ECU 1414*b* of the second LVPDU 1410*b* may each independently monitor for fault conditions and may each independently control both the input power switch 1411*a* of the first LVPDU 1410*a* and the input power switch 1411*b* of the second LVPDU 1410*b*. As illustrated in FIG. 14B, ECU 1414*a* of the first LVPDU 1410*a* is configured to generate control signal IPS1-DISC-1 to open input power switch 1411*a* to disconnect the first LVPDU 1410*a* and the first low voltage power domain from the DC-DC converter (and from the high voltage battery). ECU 1414*a* of the first LVPDU 1410*a* is further configured to generate control signal IPS2_DISC-1 to open input power switch 1411*b* to disconnect the second LVPDU 1410*b* and the second low voltage power domain from the DC-DC converter (and from the high voltage battery). Similarly, ECU 1414*b* of the second LVPDU 1410*b* is configured to generate control signal IPS1_DISC-2 to open input power switch 1411*a* to disconnect the first LVPDU 1410*a* and the first low voltage power domain from the DC-DC converter (and from the high voltage battery). ECU 1414*b* of the second LVPDU 1410*b* is further configured to generate control signal IPS2_DISC-2 to open input power switch 1411*b* to disconnect the second LVPDU 1410*b* and the second low voltage power domain from the DC-DC converter (and from the high voltage battery). And requests and sensor data may also be exchanged over communication link 1413 between the ECUs 1414*a* and 1414*b*.

In this configuration, each of the ECUs 1414*a* and 1414*b* may independently generate the control signals based at least in part on one or more of: output current of the DC-DC converter (DC-DC_Current), output voltage of the DC-DC converter (DC-DC_Voltage), a temperature of the DC-DC converter (DC-DC_Temp), a status of the high voltage battery HV_Battery_Status, a status of the high voltage power domain (HV_PD_Status), a status of the first low voltage power domain (LV_PD_1_Status), a status of the first low voltage backup battery (LV_Battery_1_Status), a status of the second low voltage power domain (LV_PD_2_Status), a status of the second low voltage backup battery (LV_Battery_2_Status), and the like.

In this manner, both ECUs of the LVPDUs may intelligently control both input power switches to isolate failure conditions within the low voltage power domains. For instance, in the event that a power failure within the second low voltage power domain causes the second LVDPU 1410*b* and ECU 1414*b* to fail, the input power switch 1411*b* may still be opened by ECU 1414*a* of the first LVPDU 1410*a* such that the power failure may be isolated from the high voltage power domain and from the first low voltage power domain.

Referring to FIG. 14C, the ECU 1414*a* of a first LVPDU 1410*a* is configured to control input power switch 1414*a* of the first LVPDU 1410*a* and input power switch 1414*b* of a second LVPDU 1410*b*. To control the input power switches 1414*a* and 1414*b*, the ECU 1414*a* may monitor various information relating, for example, the output the DC-DC converter, the health of the first low voltage power domain, the health of the second low voltage power domain, the health of the high voltage battery, etc. For example, ECU 1414*a* may generate control signal IPS1_DISC-1 to disconnect the input power switch 1411*a* of the first LVPDU 1410*a* and/or control signal IPS2_DISC-1 to disconnect the input power switch 1411*b* of the second LVPDU 1410*b* based at least in part on one or more of: output current of the DC-DC converter (DC-DC_Current), output voltage of the DC-DC converter (DC-DC_Voltage), a temperature of the DC-DC converter (DC-DC_Temp), a status of the high voltage battery HV_Battery_Status, a status of the high voltage power domain (HV_PD_Status), a status of the first low voltage power domain (LV_PD_1_Status), a status of the first low voltage backup battery (LV_Battery_1_Status), a status of the second low voltage power domain (LV_PD_2_Status), a status of the second low voltage backup battery (LV_Battery_2_Status), and the like.

Figure 15:
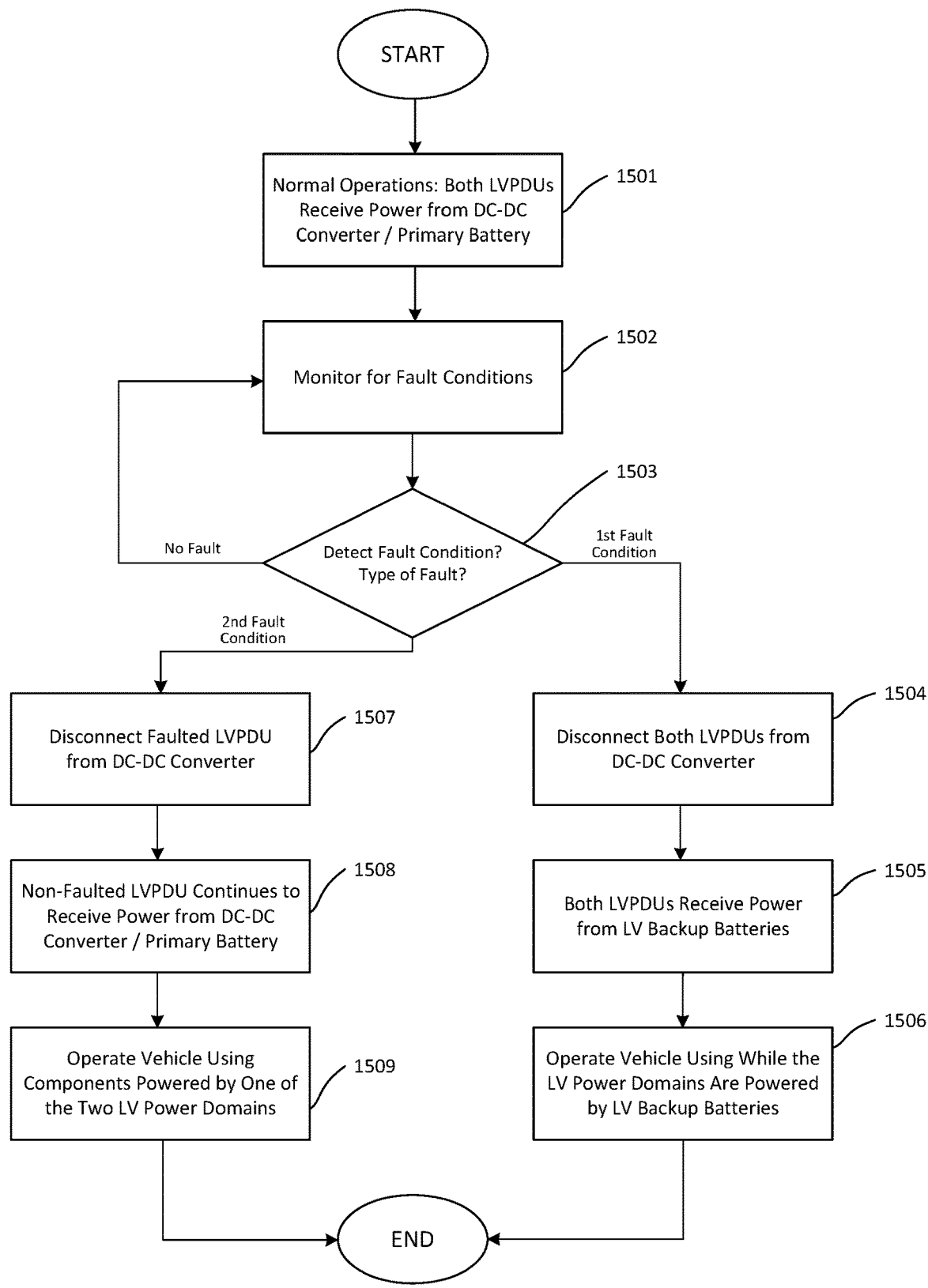
FIG. 15 is a flowchart illustrating an example process for providing power to systems within a vehicle, in accordance with an embodiment.

FIG. 15 is a flowchart illustrating an example process for providing power to systems within a vehicle, in accordance with an embodiment. The method illustrated in and described with respect to FIG. 15 may be performed by, for example, systems of the vehicle illustrated in FIGS. 12 and 13.

At step 1501, the vehicle is operating under normal conditions. As described herein, normal conditions may be used to refer to when the power systems of the vehicle are operating normally, in which a primary battery of the vehicle supplies power to a high voltage power domain of the vehicle as well as to the low voltage power domains of the vehicle. The vehicle may be operating autonomously or semi-autonomously or may be controlled by a remote operator via a teleoperations interface. Under normal operations, a first low voltage power distribution unit (e.g., LVPDU 1211*a* of FIG. 12 or LVPDU 1310*a* of FIG. 13) and a second low voltage power distribution unit (e.g., LVPDU 1211*a* of FIG. 12 or LVPDU 1310*a* of FIG. 13) both receive low voltage power from the one or more DC-DC converters, which are configured to convert power supplied by the primary battery to a lower voltage. The first and second LVPDUs each distribute the received low voltage power to the first and second low voltage power domains, respectively. Under normal operations at step 1501, the first LVPDU may be configured to charge a first low voltage backup battery and the second LVPDU may be configured to charge a second low voltage backup battery.

At step 1502, the output of one or more DC-DC converters (e.g., DC-DC converter 1245 of FIG. 12 or DC-DC converter 1345 of FIG. 13) and/or the health of various components of the high voltage power domain may be monitored to identify a fault condition. Depending on the detected fault condition, one or both of the LVPDUs may be disconnected from the one or more DC-DC converters. For instance, a first fault condition may indicate that the one or more DC-DC converters is one or more DC-DC converters may be unsuitable or unable to supply low voltage power to the first and second LVPDUs. The detected first fault condition may correspond to a fault at the DC-DC converters, the primary battery, or another component within the high voltage power domain that may cause the output of the DC-DC converters to be unsuitable for powering the low voltage power domains. In response to detecting the first fault, both of the LVDPUs may be disconnected from the one or more DC-DC converters. In contrast, a detected second fault condition may correspond to a fault within one of the low voltage power domains. In response to detecting the second fault condition, the faulted low voltage domain may be disconnected from the one or more DC-DC converters to isolate the fault.

According to embodiments, voltage output, current output, and/or temperature of the DC-DC converter may be monitored. In addition or as an alternative, the health of the high voltage power domain that supplies the power that the DC-DC converter converts to low voltage may be monitored. For instance, the health of the high voltage battery (e.g., HV power source 1231 of FIG. 12 or HV power source 1331 of FIG. 13) may be monitored. Furthermore, each of the first and second low voltage power domains may also be monitored. A fault condition may be one or more of a short circuit condition, a ground fault, an abnormal current level (e.g., too low or too high), an abnormal voltage level (e.g., too low or too high), a high temperature condition, a voltage fluctuation condition (e.g., voltage surges or unstable voltage levels), a current fluctuation condition, a critically low state of charge of the high voltage battery, etc.

In response to detecting the first fault condition (e.g., corresponding to a fault associated with the one or more DC-DC converters, the primary battery, and/or the high voltage power domain) at step 1503, the vehicle may be configured to, at step 1504, disconnect both the first LVPDU and the second LVPDU from the one or more DC-DC converters. Depending on the implementation, a first input power switch may couple the first low voltage power distribution unit and the first low voltage power domain to the output of the one or more DC-DC converters. Similarly, a second input power switch may couple the second low voltage power distribution unit and the second low voltage power domain to the output of the one or more DC-DC converters. The first and second input power switches may be opened in response to detecting the first fault condition.

According to embodiments, at step 1505, after the first and second LVPDUs are disconnected from the one or more DC-DC converters, first and second LVPDUs may each receive power from a respective low voltage backup battery.

The LVPDUs may distribute the power received from the low voltage backup batteries to the first and second voltage power domains.

At step 1506, the vehicle may continue to operate under the first fault condition. For instance, the vehicle may continue to operate autonomously, semi-autonomously, or under teleoperations control while under the first fault condition. In a first scenario, the primary battery is unable to supply high voltage to the high voltage domain of the vehicle. In such a first scenario, the motor of the vehicle is unable to be operated and the vehicle may be configured to perform an autonomous safe stop while the low voltage power domains are powered by their respective low voltage backup batteries. For instance, braking and steering actuators may remain powered by the first low voltage power domain or the second low voltage power domain using power supplied by the low voltage backup batteries. And a redundant compute powered by the first and/or second low voltage power domains may generate backup autonomy commands control the braking and steering actuators to enable the vehicle to make the autonomous safe stop.

In a second scenario, the primary battery is able to supply high voltage to the high voltage domain of the vehicle and the first detected fault condition may be a fault associated with the one or more DC-DC converters. In this scenario, the first low voltage battery and/or the second low voltage battery may be configured to supply low voltage power to certain elements within the high voltage power domain (e.g., a high voltage battery management unit) to enable the high voltage power domain and its components, such as the drivetrain motor, main compute, etc. to continue to operate. In this scenario, the vehicle may perform an autonomous safe stop or may autonomously drive a further distance (e.g., to a designated safe stop area) after experiencing the first fault condition.

Referring back to step 1503, if the second fault condition (e.g., a fault condition within one of the low voltage power domains) is detected, one of the LVPDUs may be disconnected from the one or more DC-DC converters at step 1507. For example, if a fault is detected within the first low voltage power domain, the first LVPDU may be disconnected to isolate the fault and prevent the fault from affecting components within the high voltage power domain or the second low voltage power domain. Similarly, if a fault is detected within the second low voltage power domain, the second LVPDU may be disconnected from the one or more DC-DC converters. In response to detecting the second fault condition, the faulted low voltage power domain may also be disconnected from its low voltage backup battery to prevent, for example, a short circuit condition in the faulted low voltage power domain from draining the low voltage backup battery or causing dangerous temperature conditions.

At step 1508, the other LVPDU (e.g., the LVPDU associated with the non-faulted low voltage power domain) may continue to receive power from the one or more DC-DC converters.

At step 1509, the vehicle may continue operating under the second fault condition. For instance, the vehicle may have been operating at step 1501 in an autonomous or semi-autonomous manner and may continue operating at 1509 in an autonomous or semi-autonomous manner. As another example, the vehicle may have been operating at step 1501 while being remotely controlled by a remote operator and at step 1509 may continue to be operated by the remote operator while under the second fault condition. At step 1509, the brainstem computer, braking actuators, and steering actuators may be configured to receive power from the still-functional low voltage power domain.

In more detail, the vehicle may comprise two sets of sensors, a first set of sensors powered by the first low voltage power domain and a second set of sensors powered by the second low voltage power domain. Under normal operations (e.g., step 1501), the vehicle may operate in an autonomous or semi-autonomous manner using data generated by both the first set of sensors and the second set of sensors. At step 1509, if the detected second fault condition corresponds to a fault of within the first low voltage power domain, the vehicle may be configured to operate (e.g., to perform an autonomous safe stop) while the first set of sensors are inoperable or non-functional due to the detected second fault condition. Similarly, if the detected second fault condition corresponds to a fault of within the second low voltage power domain, the vehicle may be configured to operate (e.g., to perform an autonomous safe stop) while the second set of sensors are inoperable or non-functional due to the detected second fault condition.

Although only a few embodiments have been described in this disclosure, it should be understood that the disclosure may be embodied in many other specific forms without departing from the spirit or the scope of the present disclosure. By way of example, although a power source of an LVPDU has generally been described as being a DC-DC converter, it should be appreciated that a power source is not limited to being a DC-DC converter. A power source may generally be any type of electric power converter which may be sufficient to provide low voltage power sufficient for use by systems of an autonomous vehicle. In one embodiment, a power source may be an electrical circuit or device configured to convert a source of direct current from a first voltage level to a second voltage level.

In general, an amount of voltage considered to be "low" may vary widely. For instance, low voltage may be any voltage that is less than approximately fifty volts. While LVPDUs has been described as distributing low voltage power, an LVPDU may be arranged to provide any amount or level of voltage that may be used by systems of an autonomous vehicle. An LVPDU may also be referred to as a power distribution unit.

An LVPDU may include components which have not been shown above, e.g., in FIG. 6 or in FIG. 13, for ease of illustrations. Such components may include, but are not limited to including, switches, e.g., switches configured to switch from providing power using a power supply or source to using a plurality of backup batteries. Such components may also include, but are not limited to including, voltage regulators, voltage sensors, current sensors, and switches. For example, an LVPDU may be configured to detect or measure a current drawn by an individual component (e.g., a long-range LiDAR) using a current sense amplifier and may cause the switch providing power to the individual component to be opened in response to detecting an overcurrent or short circuit condition for the individual component.

The power source onboard an LVPDU may effectively be powered by substantially any source associated with an autonomous vehicle. For example, a DC-DC converter and an LVPDU may draw power from a main power supply of an autonomous vehicle. It should be understood, however, that an LVPDU is not limited to drawing power from a main power supply of an autonomous vehicle. And although the first and second LVPDUs of the vehicle are described herein as being configured to draw power from respective backup batteries, a common backup battery may be configured to supply power to both the first and second LVPDUs in the event of an issue with the primary power supply and/or the DC-DC converter.

In some embodiments, there may effectively be at least three low voltage power domains in an autonomous vehicle. A first power domain may essentially be an approximately twelve volt base, and may be a power domain for non-safety critical peripherals. In such an embodiment, the second and third power domains may be arranged to power safety critical peripherals. The second and third power domains may each have a DC-DC power source and batteries. In one such an embodiment, the first and second low voltage power domains may be similar to examples described with respect to FIG. 12. In particular, the first and second low voltage power domains may each power a respective set of safety critical components of the autonomous vehicle and each may draw power from a respective low voltage backup battery when the primary power source (or the DC-DC converter) of the autonomous vehicle is unable or unsuitable for supplying power to the first and second low voltage power domains. The third low voltage power domain may essentially be an approximately twelve volt base, and may be a power domain for non-safety critical peripherals of the autonomous vehicle. In another such an embodiment, three low voltage domains may each be similar to examples described with respect to FIG. 12 or FIG. 13. In particular, each of the three low voltage domains may power a respective set of safety critical components of the autonomous vehicle and may share a common low voltage backup battery.

And the LVPDU of the first low voltage power domain may include logic and circuitry to control a failsafe switch that couples the LVPDU of the second low voltage power domain to the backup low voltage power source, and vice versa. The third low voltage power domain may essentially be an approximately twelve volt base, and may be a power domain for non-safety critical peripherals of the autonomous vehicle. In another such an embodiment, three low voltage domains may each be similar to examples described with respect to FIG. 6. In particular, each of the three low voltage domains may power a respective set of safety critical components of the autonomous vehicle and may share a common low voltage backup battery. The LVPDU of each low voltage domain may include logic and circuitry to control respective failsafe switches that couple the other two low voltage domains to the low voltage backup battery. Such an embodiment may further include other low voltage power domains that power non-safety critical peripherals.

An autonomous vehicle has generally been described as a land vehicle, or a vehicle that is arranged to be propelled or conveyed on land. It should be appreciated that in some embodiments, an autonomous vehicle may be configured for water travel, hover travel, and or/air travel without departing from the spirit or the scope of the present disclosure. In general, an autonomous vehicle may be any suitable transport apparatus that may operate in an unmanned, driverless, self-driving, self-directed, and/or computer-controlled manner.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIG. 3, may include hardware, firmware, and/or software embodied on a tangible medium. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples are not to be limited to the details given herein, but may be modified within the scope of the appended claims.

What is claimed is:

1. A power system for a vehicle, the power system comprising:
   a primary battery that outputs power at a first voltage;
   one or more DC-DC converters that receive the power output by the primary battery, wherein the one or more DC-DC converters output power at a second voltage that is lower than the first voltage;
   a first power distribution unit that is configured to (i) receive power, at the second voltage, from the one or more DC-DC converters or from a first backup battery and (ii) provide the received power to a first low voltage power domain of the vehicle, wherein the first power distribution unit includes a first input switch for connecting to the one or more DC-DC converters;
   a second power distribution unit that is configured to (i) receive power, at the second voltage, from the one or more DC-DC converters or from a second backup battery and (ii) provide the received power to a second low voltage power domain of the vehicle, wherein the second power distribution unit includes a second input switch for connecting to the one or more DC-DC converters; and
   wherein, in response to detecting a fault condition, the first input switch of the first power distribution unit is opened to disconnect the first power distribution unit from the one or more DC-DC converters, and the first power distribution unit receives the power from the first backup battery.

2. The power system of claim 1, wherein the fault condition corresponds to a fault detected at an output of the one or more DC-DC converters; and
   wherein, when the fault detected at the output of the one or more DC-DC convertors in a first fault condition, in response to detecting the first fault condition, a second input switch of the second power distribution unit is opened to disconnect the second power distribution unit from the one or more DC-DC converters, and the second power distribution unit receives power from a second low backup battery.

3. The power system of claim 1, wherein the fault condition corresponds to a fault within the first low voltage power domain; and wherein, in response to detecting the fault condition, the second power distribution unit remains connected to the one or more DC-DC converters and continues to receive power from the one or more DC-DC converters.

4. The power system of claim 1, wherein the first low voltage power domain includes a first set of sensors and the second low voltage power domain includes a second set of sensors, the first set of sensors and the second set of sensors each generating data for operating the vehicle in an autonomous or semi-autonomous manner.

5. The power system of claim 4, wherein the vehicle is configured to perform an autonomous safe stop using data generated by one of the first set of sensors and the second set of sensors.

6. The power system of claim 1, wherein the first power distribution unit further includes an error correct unit that is configured to generate a signal to open the first input switch to disconnect the first power distribution unit from the one or more DC-DC converters in response to detecting the fault condition.

7. The power system of claim 1, wherein the second power distribution unit further includes an error correct unit that is configured to generate a signal to open the first input switch to disconnect the first power distribution unit from the one or more DC-DC converters in response to detecting the fault condition.

8. A vehicle that is capable of operating autonomously or semi-autonomously, the vehicle comprising:
a main computing system configured to generate primary autonomy commands based on data output by a first set of sensors and by a second set of sensors;
a redundant computing system configured to generate backup autonomy commands;
a vehicle control system configured to control the vehicle based on the primary autonomy commands or the backup autonomy commands;
a first power distribution unit configured to receive power from a primary power source of the vehicle or from a first backup power source and configured to provide the received power to the first set of sensors, the vehicle control system, and the redundant computing system; and
a second power distribution unit configured to receive power from the primary power source of the vehicle or from a second backup power source and configured to provide the received power to the second set of sensors, the vehicle control system, and the redundant computing system.

9. The vehicle of claim 8, wherein, in response to detecting a fault condition, both the first power distribution unit and the second power distribution unit are disconnected from the primary power source and receive power from the first backup power source and the second backup power source, respectively.

10. The vehicle of claim 8, wherein, in response to detecting a fault condition, one of the first power distribution unit and the second power distribution unit is disconnected from the primary power source.

11. The vehicle of claim 8, wherein the redundant computing system includes a first computing assembly configured to receive power from the first power distribution unit and a second computing assembly configured to receive power from the second power distribution unit.

12. The vehicle of claim 11, wherein, in response to a first fault that prevents the first computing assembly from functioning, the second computing assembly is configured to generate the backup autonomy commands; and wherein, in response to a second fault that prevents the second computing assembly from functioning, the first computing assembly is configured to generate the backup autonomy commands.

13. The vehicle of claim 8, wherein the redundant computing assembly is configured to generate the backup autonomy commands to cause the vehicle to perform an autonomous safe stop.

14. The vehicle of claim 8, wherein the redundant computing assembly is configured to generate the backup autonomy commands to cause the vehicle to perform an autonomous safe stop while the vehicle is under a fault condition that prevents one of the first set of sensors and the second set of sensors from providing sensor data.

15. The vehicle of claim 8, wherein the first set of sensors includes a first set of cameras, a first LiDAR sensor, and a first radar sensor and the second set of sensors includes a second set of cameras, a second LiDAR sensor, and a second radar sensor.

16. The vehicle of claim 8, further comprising:
a drivetrain motor powered by the primary power supply, wherein the primary power supply outputs power at a first voltage;
one or more DC-DC converters configured to receive power output by the primary power source to output power at a second voltage, wherein the second voltage is lower than the first voltage; and
wherein the first and second power distribution units are each configured to receive power at the second voltage.

17. A method for supplying power to components of a vehicle, the method comprising:
converting, by one or more DC-DC converters, power supplied by a primary battery of the vehicle from a first voltage to a second voltage, the one or more DC-DC converters being configured to supply power having the second voltage to a first power domain and to a second power domain;
monitoring for a fault condition;
in response to detecting the fault condition, disconnecting at least one of the first power domain and the second power domain from the one or more DC-DC converters; and
operating the vehicle in an autonomous manner under the fault condition.

18. The method of claim 17, wherein operating the vehicle in an autonomous manner under the fault condition includes performing a safe stop.

19. The method of claim 17, further comprising:
disconnecting both of the first power domain and the second power domain from the one or more DC-DC converters;
providing power, at the second voltage, from a first backup battery to the first power domain; and
providing power, at the second voltage, from a second backup battery to the second power domain, wherein the detected fault condition corresponds to a fault associated with an output of the one or more DC-DC converters.

20. The method of claim 17, further comprising:
disconnecting only the first power domain from the one or more DC-DC converters;
providing power, at the second voltage, from a first backup battery to the first power domain; and
continuing to provide power, at the second voltage, from the one or more DC-DC converters to the second power domain, wherein the detected fault condition corresponds to a fault associated with the first power domain.

* * * * *